United States Patent
Shigeta

(10) Patent No.: US 11,317,032 B2
(45) Date of Patent: Apr. 26, 2022

(54) IMAGING DEVICE, IMAGING SYSTEM, MOBILE APPARATUS, AND CONTROL METHOD OF IMAGING DEVICE

(71) Applicant: CANON KABUSHIKI KAISHA, Tokyo (JP)

(72) Inventor: Kazuyuki Shigeta, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/700,950

(22) Filed: Dec. 2, 2019

(65) Prior Publication Data
US 2020/0213502 A1 Jul. 2, 2020

(30) Foreign Application Priority Data
Dec. 27, 2018 (JP) .............................. JP2018-245447

(51) Int. Cl.
*H04N 5/235* (2006.01)
*H04N 5/232* (2006.01)

(52) U.S. Cl.
CPC ......... *H04N 5/2353* (2013.01); *H04N 5/2355* (2013.01); *H04N 5/23232* (2013.01)

(58) Field of Classification Search
CPC ............... H04N 5/2353; H04N 5/2355; H04N 5/23232; H04N 5/35581; H04N 5/2351; H04N 5/2357; H04N 5/3745; H04N 5/378
See application file for complete search history.

(56) References Cited

U.S. PATENT DOCUMENTS

| | | | |
|---|---|---|---|
| 7,834,915 B2 * | 11/2010 | Wakazono | H04N 5/243 348/229.1 |
| 7,859,575 B2 | 12/2010 | Ota | |
| 8,189,086 B2 | 5/2012 | Hashimoto | |
| 8,310,576 B2 | 11/2012 | Hashimoto | |
| 8,390,710 B2 | 3/2013 | Shigeta | |
| 8,553,119 B2 | 10/2013 | Hashimoto | |
| 8,624,992 B2 | 1/2014 | Ota | |
| 8,836,832 B2 | 9/2014 | Shigeta | |
| 8,928,789 B2 | 1/2015 | Hashimoto | |
| 9,049,389 B2 | 6/2015 | Hashimoto | |
| 9,191,600 B2 | 11/2015 | Hashimoto | |

(Continued)

FOREIGN PATENT DOCUMENTS

JP 2013-74334 4/2013

*Primary Examiner* — Luong T Nguyen
(74) *Attorney, Agent, or Firm* — Venable LLP

(57) ABSTRACT

Provided is an imaging device including: a photoelectric conversion unit; a charge holding portion; a charge transfer unit that transfers charges from the photoelectric conversion unit to the charge holding portion; an output unit that outputs a signal based on transferred charges; a first acquisition unit that acquires first image data based on charges generated in the photoelectric conversion unit in a first exposure time period; a second acquisition unit that acquires second image data based on charges generated in the photoelectric conversion unit in a second exposure time period that is a sum of exposure time periods for charges transferred from the photoelectric conversion unit to the charge holding portion for multiple times by the charge transfer unit and is longer than the first exposure time period; and a compression unit that reduces a gradation value of the second image data to generate a third image data.

18 Claims, 14 Drawing Sheets

(56) References Cited

U.S. PATENT DOCUMENTS

| | | |
|---|---|---|
| 9,282,271 B2 | 3/2016 | Hashimoto |
| 9,300,889 B2 | 3/2016 | Hashimoto |
| 9,413,964 B2 | 8/2016 | Kawano |
| 9,912,886 B2 | 3/2018 | Shigeta |
| 10,244,192 B2 | 3/2019 | Shigeta |
| 10,498,997 B2 | 12/2019 | Shigeta |
| 2004/0228508 A1* | 11/2004 | Shigeta .............. G06K 9/00026 382/124 |
| 2005/0141772 A1* | 6/2005 | Okada .................. H04N 19/152 382/238 |
| 2006/0033823 A1* | 2/2006 | Okamura .............. H04N 5/235 348/254 |
| 2008/0284872 A1* | 11/2008 | Asoma .................. H04N 5/235 348/229.1 |
| 2010/0157083 A1 | 6/2010 | Ohya |
| 2010/0321532 A1 | 12/2010 | Hashimoto |
| 2014/0334741 A1* | 11/2014 | Takeru ................... G06T 5/002 382/264 |
| 2019/0356870 A1 | 11/2019 | Shigeta |

* cited by examiner

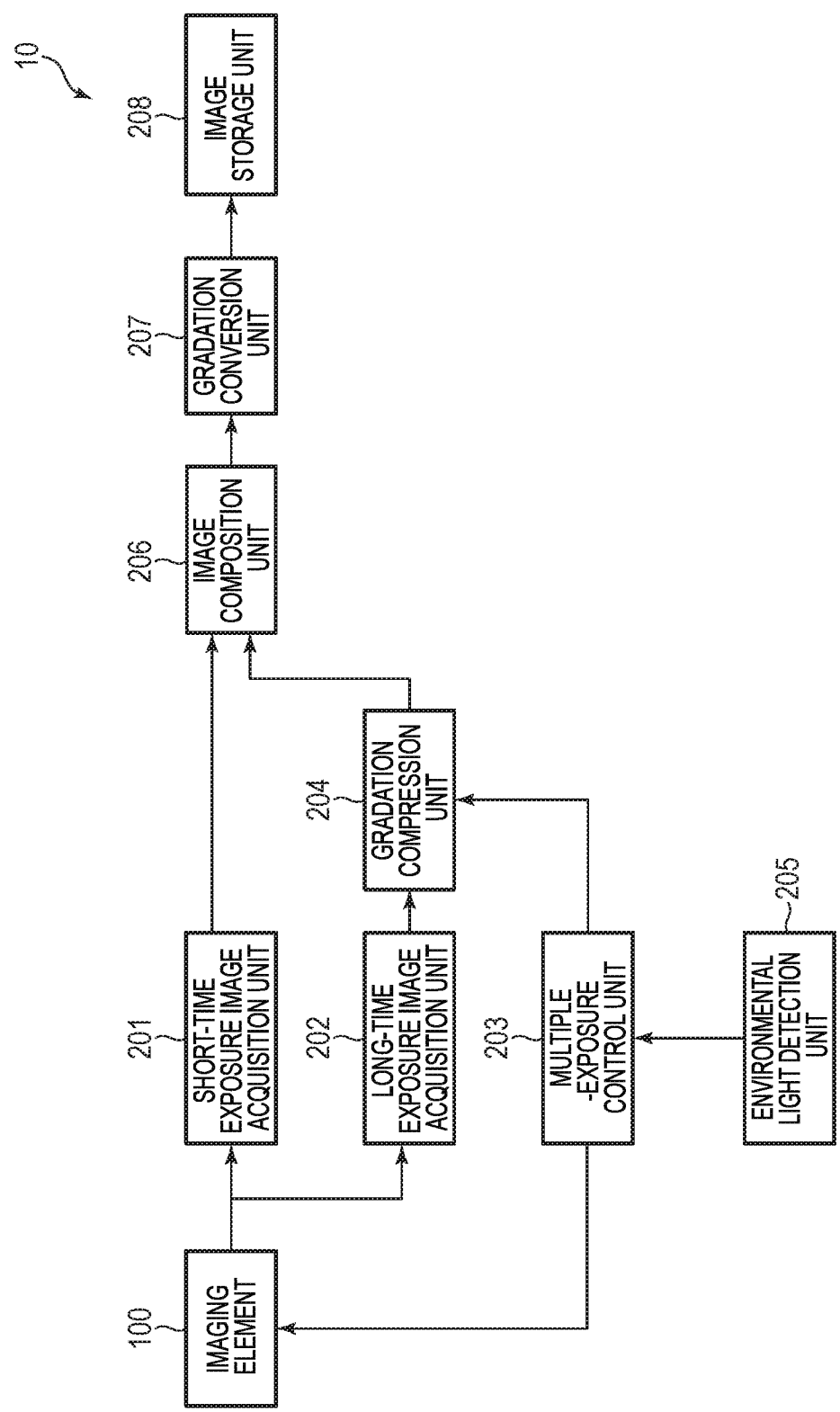

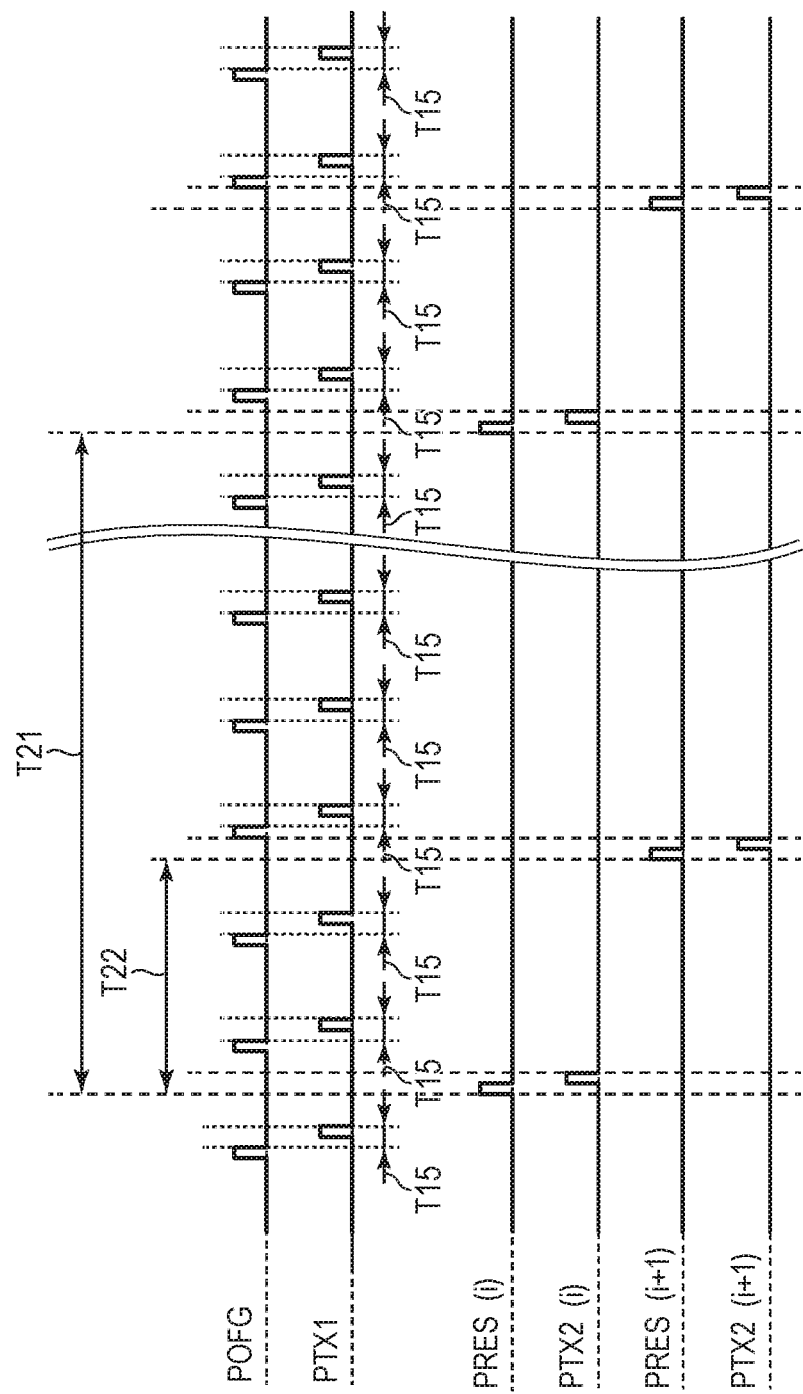

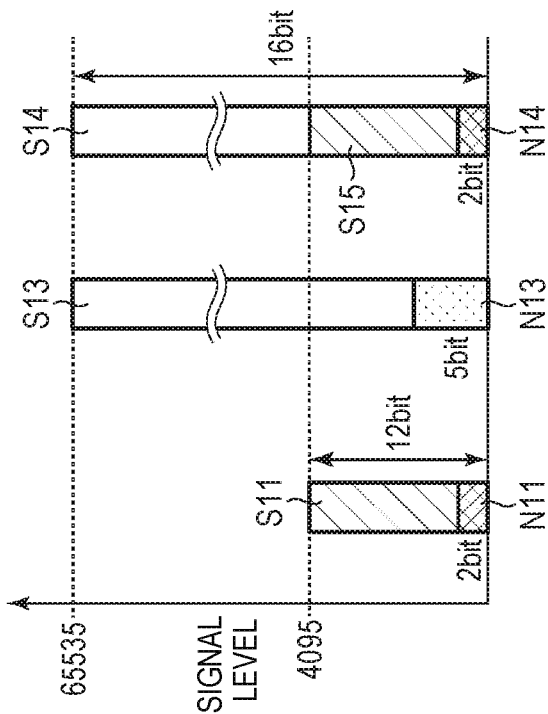
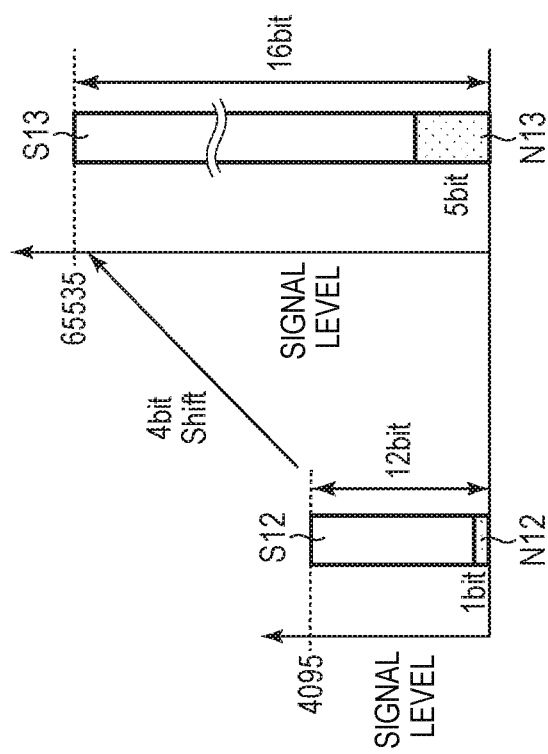
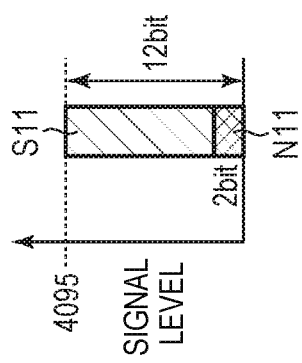

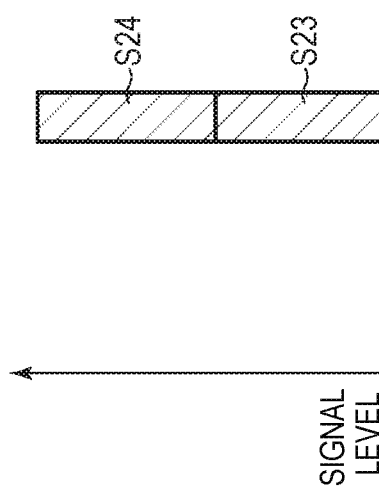
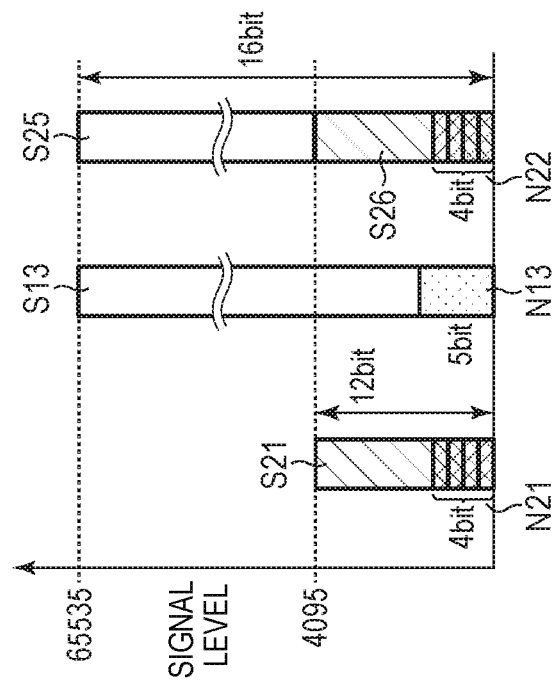
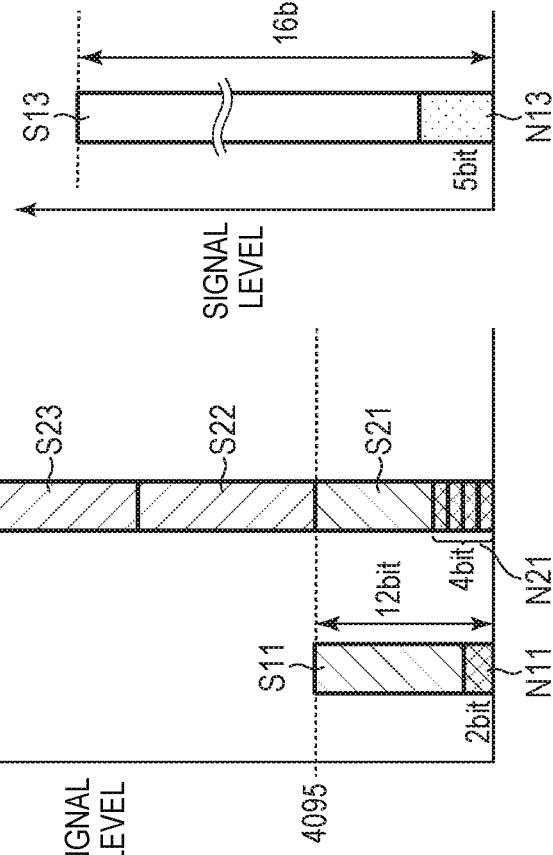
FIG. 7A
FIG. 7B
FIG. 7C

IMAGING DEVICE, IMAGING SYSTEM, MOBILE APPARATUS, AND CONTROL METHOD OF IMAGING DEVICE

BACKGROUND OF THE INVENTION

Field of the Invention

The present invention relates to an imaging device, an imaging system, a mobile apparatus, and a control method of the imaging device.

Description of the Related Art

Japanese Patent Application Laid-Open No. 2013-74334 discloses an imaging device that can capture a plurality of images at exposure amounts that are different from each other and compose the plurality of images to generate an image having an expanded dynamic range.

In the imaging device that can capture a plurality of images with different exposure time periods as disclosed in Japanese Patent Application Laid-Open No. 2013-74334, there may be a problem of a flicker phenomenon in which brightness of the captured image varies in accordance with turning on and off of a light source.

SUMMARY OF THE INVENTION

The present invention intends to provide an imaging device, an imaging system, a mobile apparatus, and a control method of the imaging device that can reduce influence of a flicker phenomenon while maintaining image quality when acquiring a plurality of images with different exposure time periods.

According to an aspect of the present invention, provided is an imaging device including: a photoelectric conversion unit configured to generate charges in accordance with an incident light; a charge holding portion configured to hold the charges; a charge transfer unit configured to transfer the charges from the photoelectric conversion unit to the charge holding portion; an output unit configured to output a signal based on charges transferred to the charge holding portion; a first acquisition unit configured to acquire first image data based on charges generated in the photoelectric conversion unit in a first exposure time period; a second acquisition unit configured to acquire second image data based on charges generated in the photoelectric conversion unit in a second exposure time period that is a sum of exposure time periods for charges transferred from the photoelectric conversion unit to the charge holding portion for multiple times by the charge transfer unit and is longer than the first exposure time period; and a compression unit configured to reduce a gradation value of the second image data to generate a third image data.

According to another aspect of the present invention, provided is a control method of an imaging device including a photoelectric conversion unit configured to generate charges in accordance with an incident light, a charge holding portion configured to hold the charges, a charge transfer unit configured to transfer the charges from the photoelectric conversion unit to the charge holding portion, and an output unit configured to output a signal based on charges transferred to the charge holding portion. The control method including: acquiring first image data based on charges generated in the photoelectric conversion unit in a first exposure time period; acquiring second image data based on charges generated in the photoelectric conversion unit in a second exposure time period that is a sum of exposure time periods for charges transferred from the photoelectric conversion unit to the charge holding portion by the charge transfer unit for multiple times and is longer than the first exposure time period; and generating a third image data by reducing a gradation value of the second image data.

Further features of the present invention will become apparent from the following description of exemplary embodiments with reference to the attached drawings.

BRIEF DESCRIPTION OF THE DRAWINGS

FIG. 3 is a block diagram illustrating a general configuration of an imaging device according to the first embodiment.

FIG. 4A and FIG. 4B are timing diagrams illustrating an operation of the imaging device according to the first embodiment.

FIG. 6A, FIG. 6B and FIG. 6C are schematic diagrams illustrating a dynamic-range expansion process according to a first comparative example.

FIG. 7A, FIG. 7B and FIG. 7C are schematic diagrams illustrating a dynamic-range expansion process according to a second comparative example.

DESCRIPTION OF THE EMBODIMENTS

Preferred embodiments of the present invention will now be described in detail in accordance with the accompanying drawings. Throughout the drawings, the same components or corresponding components are labeled with common references, and the description thereof may be omitted or simplified.

First Embodiment

Figure 1:
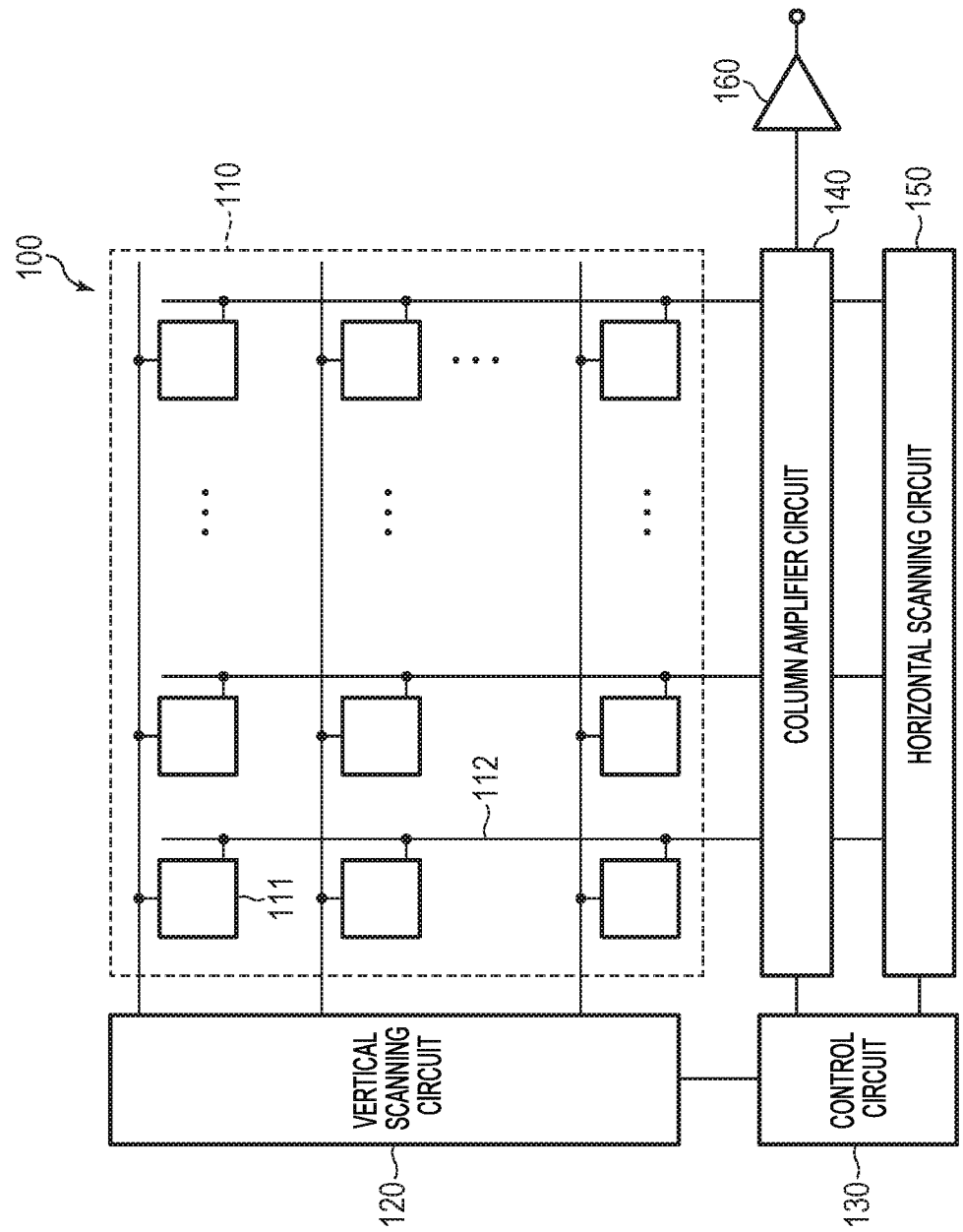
FIG. 1 is a block diagram illustrating a general configuration of an imaging element according to a first embodiment.

FIG. 1 is a block diagram illustrating a general configuration of an imaging element 100 according to the present embodiment. The imaging element 100 has a pixel array 110, a vertical scanning circuit 120, a control circuit 130, a column amplifier circuit 140, a horizontal scanning circuit 150, and an output circuit 160. The pixel array 110 has a plurality of pixels 111 arranged to form a plurality of rows and a plurality of columns.

The control circuit 130 controls drive timings of respective units of the vertical scanning circuit 120, the column amplifier circuit 140, and the horizontal scanning circuit 150. The vertical scanning circuit 120 supplies control signals used for controlling a plurality of transistors included in the pixels 111 to be switched on (conduction state) or off (nonconductive state). The vertical scanning circuit 120 may be formed of a logic circuit such as a shift register, an address decoder, or the like. The column signal line 112 is provided on each column of the pixel array 110, and signals from the pixels 111 are read out to column signal lines 112 on a column basis.

The column amplifier circuit 140 performs processing such as an amplification process of a signal output to the column signal line 112, a correlated double sampling process based on a signal at the time of reset of the pixels 111 and a signal at the time of photoelectric conversion, or the like. The horizontal scanning circuit 150 supplies control signals used for switching on or off switches connected to amplifiers of the column amplifier circuit 140. Thereby, the horizontal scanning circuit 150 performs control to output a signal of a selected column to the output circuit 160.

The output circuit 160 is formed of a buffer amplifier, a differential amplifier, or the like and outputs a signal from the column amplifier circuit 140 to a signal processing unit outside the imaging element 100. Note that the column amplifier circuit 140 may include a function of a signal processing circuit or the like that performs signal processing such as correction of a false signal component. Further, an analog-to-digital (AD) converter circuit may be further provided in the imaging element 100, and thereby the imaging element 100 may be configured to output a digital signal.

Figure 2:
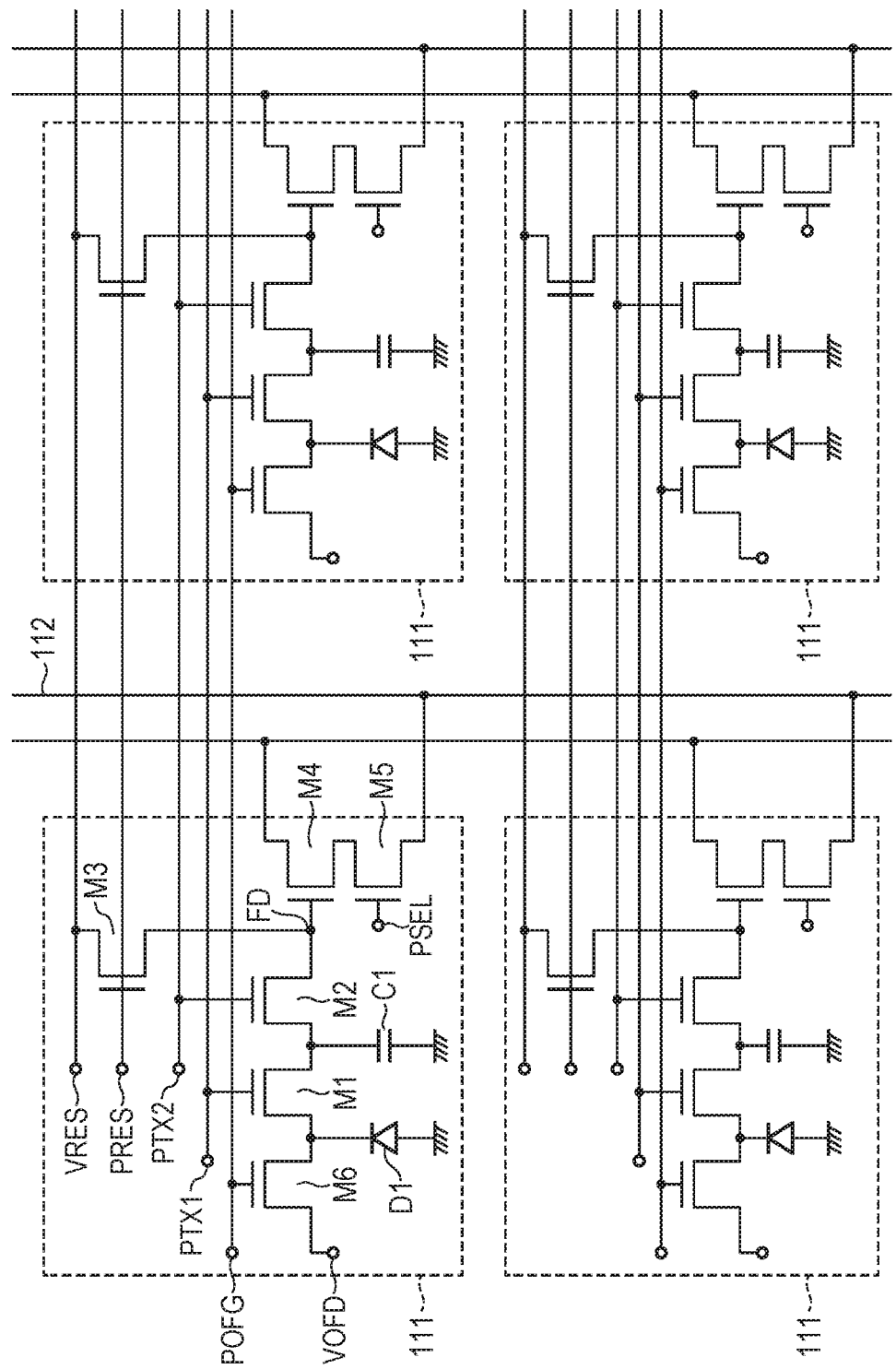
FIG. 2 is a diagram illustrating a circuit configuration of pixels according to the first embodiment.

FIG. 2 is a diagram illustrating a circuit configuration of the pixels 111 according to the first embodiment. FIG. 2 illustrates four pixels 111 of two rows by two columns as an example. The pixel 111 has a photoelectric conversion unit D1, a charge holding portion C1, a first transfer transistor M1, a second transfer transistor M2, a reset transistor M3, an amplification transistor M4, a select transistor M5, and a drain transistor M6. Each of these transistors is a MOS transistor, for example.

The photoelectric conversion unit D1 photoelectrically converts an incident light and accumulates charges generated by the photoelectric conversion. As the photoelectric conversion unit D1, a photodiode may be used, for example. In the following description, the photoelectric conversion unit D1 is a photodiode having an anode and a cathode. The anode of the photoelectric conversion unit D1 is connected to a ground potential line, and the cathode is connected to the source of the first transfer transistor M1 and the source of the drain transistor M6. The drain of the first transfer transistor M1 is connected to the source of the second transfer transistor M2. The parasitic capacitance between the drain of the first transfer transistor M1 and the source of the second transfer transistor M2 forms the charge holding portion C1. The drain of the drain transistor M6 is connected to a potential line that supplies a drain potential VOFD.

The drain of the second transfer transistor M2 is connected to the source of the reset transistor M3 and the gate of the amplification transistor M4. The connection node of the drain of the second transfer transistor M2, the source of the reset transistor M3, and the gate of the amplification transistor M4 is a floating diffusion region FD. The drain of the reset transistor M3 is connected to a potential line that supplies a reset potential VRES. The source of the amplification transistor M4 is connected to the drain of the select transistor M5. The drain of the amplification transistor M4 is connected to a power source voltage line. The source of the select transistor M5 is connected to the column signal line 112. A current source (not illustrated) is connected to the column signal line 112.

On each row of the pixel array 110, a plurality of control signal lines are arranged extending in a row direction (the horizontal direction in FIG. 2). The vertical scanning circuit 120 supplies control signals to transistors within the pixel 111 via a plurality of control signal lines. The vertical scanning circuit 120 supplies control signals PTX1, PTX2, PRES, PSEL, and POFG to respective gates of the first transfer transistor M1, the second transfer transistor M2, the reset transistor M3, the select transistor M5, and the drain transistor M6.

When switched on by the control signal PTX1, the first transfer transistor M1 (charge transfer unit) transfers charges generated by the photoelectric conversion unit D1 to the charge holding portion C1. The charge holding portion C1 holds charges transferred from the photoelectric conversion unit D1. When switched on by the control signal PTX2, the second transfer transistor M2 transfers charges held in the charge holding portion C1 to the floating diffusion region FD.

When switched on by the control signal PRES, the reset transistor M3 resets the potential of the floating diffusion region FD. When switched on by the control signal PSEL, the select transistor M5 causes a signal to be output from the amplification transistor M4 on the row of interest to the column signal line 112. At this time, the amplification transistor M4 and the current source connected to the column signal line 112 form a source follower circuit that outputs a signal in accordance with charges transferred to the floating diffusion region FD and thereby function as an output unit. When switched on by the control signal POFG, the drain transistor M6 drains charges accumulated in the photoelectric conversion unit D1 and resets the potential of the cathode of the photoelectric conversion unit D1.

The above configuration realizes a configuration in which, while charges are held in the charge holding portion C1, charges are generated by the photoelectric conversion unit D1 and accumulated in the photoelectric conversion unit D1. Thereby, the imaging element 100 can perform driving in a global electronic shutter scheme that causes the start time and the end time of charge accumulation to be matched in a plurality of photoelectric conversion units D1 within the pixel array 110. The start of charge accumulation by the global electronic shutter scheme can be realized by controlling the plurality of drain transistors M6 within the pixel array 110 from an on-state to an off-state at the same time and thereby draining charges, for example. Further, charge accumulation by the global electronic shutter scheme can be stopped by controlling the plurality of first transfer transistors M1 within the pixel array 110 from an off-state to an on-state at the same time and again controlling the same to an off-state to transfer charges, for example.

Note that the drain transistor M6 is not essential and may be replaced with a configuration called Vertical Overflow Drain in which charges from the photoelectric conversion unit D1 are drained to a semiconductor substrate on which the imaging element 100 is formed. Further, a second reset transistor used for resetting the potential of the charge holding portion C1 may be added. In such a case, in a period after the second transfer transistor M2 is switched from an on-state to an off-state and before charges are transferred from the photoelectric conversion unit D1 to the charge holding portion C1, the second reset transistor may be switched on to reset the potential of the charge holding portion C1.

FIG. 3 is a block diagram illustrating a general configuration of an imaging device 10 of the present embodiment. The imaging device 10 includes the imaging element 100, a short-time exposure image acquisition unit 201, a long-time exposure image acquisition unit 202, a multiple-exposure control unit 203, a gradation compression unit 204, an environmental light detection unit 205, an image composition unit 206, a gradation conversion unit 207, and an image storage unit 208. The imaging element 100 is a CMOS image sensor of the global electronic shutter scheme having the configuration illustrated in FIG. 1 and FIG. 2. In the present embodiment, the imaging element 100 outputs digital image data. Further, the number of output bits of the imaging element 100 is 12 bits, that is, the output value of the imaging element 100 ranges 4096 gradations, which may take a value from 0 to 4095.

The imaging element 100 outputs first image data with a first exposure time period in which an accumulation time period for charges caused by an incident light is set to be relatively short and second image data with a second exposure time period in which an accumulation time period for charges caused by an incident light is set to be relatively long. In the following, the first exposure time period of a relatively short exposure time period may be referred to as short-time exposure, and the second exposure time period of a relatively long exposure time period may be referred to as long-time exposure.

The short-time exposure image acquisition unit 201 (first acquisition unit) acquires the first image data of short-time exposure output from the imaging element 100. Further, the long-time exposure image acquisition unit 202 (second acquisition unit) acquires the second image data of long-time exposure output from the imaging element 100. The first image data of short-time exposure and the second image data of long-time exposure are output from an image data output-terminal of the imaging element 100 alternately on a frame basis, for example.

The environmental light detection unit 205 is a section that detects an environmental light in a capturing environment of the imaging device 10 to acquire environmental light information. The environmental light detection unit 205 can acquire information regarding a cycle of turning on and off of a light source for lighting as environmental light information by detecting intensity variation of an environmental light. Further, the environmental light detection unit 205 can detect a state of surrounding brightness at daytime, nighttime, evening, or the like. The environmental light detection unit 205 acquires the above environmental light information in order to determine the operation of the multiple-exposure control unit 203 that sets the number of times of multiple exposure, a reduction rate of the gradation value of a low illuminance portion (gradation value compression rate), or the like. The environmental light detection unit 205 may be an environmental light sensor mounted in the imaging device 10. Note that the environmental light detection unit 205 may be a unit that receives environmental light information from another apparatus and transmits the environmental light information to the multiple-exposure control unit 203, and in such a case, the environmental light detection unit 205 may be a host PC, a microcontroller, or the like instead of an environmental light sensor.

At least the second image data of the first image data and the second image data described above is image data acquired by multiple exposure. Multiple exposure is a process for performing transfer of charges from the photoelectric conversion unit D1 to the charge holding portion C1 at divided multiple times. Note that the first exposure time period and the second exposure time period when multiple exposure is performed mean the sum of the exposure time periods of charges transferred for multiple times.

The process of multiple exposure is controlled by the multiple-exposure control unit 203. The multiple-exposure control unit 203 generates a multiple-exposure control signal in accordance with a state of the surrounding environmental light in response to environmental light information from the environmental light detection unit 205. The multiple-exposure control unit 203 transmits a multiple-exposure control signal to the imaging element 100 and the degradation compression unit 204. The multiple-exposure control signal transmitted to the imaging element 100 is used for controlling an on/off-state of a multiple-exposure operation, the number of times of multiple-exposure, the interval in multiple exposure, or the like. The multiple-exposure control signal transmitted to the gradation compression unit 204 is used for controlling an on/off-state of gradation compression, a range of the number of gradations to be compressed, a bit shift amount at the time of compression, or the like.

The gradation compression unit 204 (compression unit) reduces the gradation value of the second image data of long-time exposure acquired by the long-time exposure image acquisition unit 202 to generate third image data. Specifically, this process may be digital processing for reducing the gradation value by bit shift to compress the dynamic range. Thereby, image processing for compressing the dynamic range so that low illuminance noise decreases is realized.

The image composition unit 206 generates fourth image data by composing the first image data of short-time exposure acquired by the short-time exposure image acquisition unit 201 and the third image data output from the gradation compression unit 204. Thereby, so-called high dynamic range composition is performed, and the fourth image data having a wide dynamic range is generated.

The gradation conversion unit 207 performs gradation conversion so that the fourth image data generated by the image composition unit 206 is converted into an image suitable for a narrow dynamic range of an output system device such as a display, the image storage unit 208, or the like. Thereby, a suitable image in accordance with the dynamic range of an output system is generated. This gradation conversion process may be gamma conversion, for example. The image data converted by the gradation conversion unit 207 is output to the image storage unit 208. The image storage unit 208 is a storage device such as a hard disk, a memory card, or the like, for example. Note that the image data converted by the gradation conversion unit 207 may be output to a display device such as a liquid crystal display instead of the image storage unit 208.

As described above, in the present embodiment, a dynamic range composition image is generated from two image data of short-time exposure and long-time exposure. In this composition process, image data of short-time exposure is used for a bright region in an image, and image data of long-time exposure is used for a dark region in the image. Thereby, high dynamic range composition that can clearly express both a bright region and a dark region is realized. For example, this technique may be applied to a surveillance camera that is required to recognize a face of a human even when it is shaded due to backlight in a bright place, an on-vehicle camera that is required to recognize a traffic signal in a bright place outside a tunnel from the inside of the tunnel, or the like. Here, at least the second image data of long-time exposure is image data acquired by multiple exposure. First, the reason for performing multiple exposure will be described.

In recent years, as light sources for lighting, fluorescent lamps, incandescent lamps, and the like are replaced with LEDs. A light source using an LED may employ pulse lighting in which the LED is turned on and off at a frequency that is twice or more the frequency of the commercial power supply (50 Hz or 60 Hz) rather than continuous lighting. Typically, since such a frequency exceeds the upper limit that can be visually recognized by a human, such blinking is not recognized by human's eyes. However, when a moving image is captured by a camera at a frame frequency of 60 frames per second or the like, some relationships between turning on/off of a light source and a frame frequency of capturing may cause a flicker phenomenon in which the brightness of frame images periodically varies. Due to such a flicker phenomenon, a moving image in which the brightness of lighting appears to periodically vary may be captured, for example. Further, when a traffic signal is captured, the traffic signal that is supposed to be in continuous lighting may be captured as if it is blinking.

In the present embodiment, by performing multiple exposure, it is possible to reduce brightness variation due to such a flicker phenomenon. Multiple exposure is a scheme to average the brightness by repeating exposure at a higher frequency than a frequency of turning on and off of a light source. This can reduce influence of a change of brightness due to turning on and off of a light source. Next, a specific process of multiple exposure will be described.

Figure 4A:
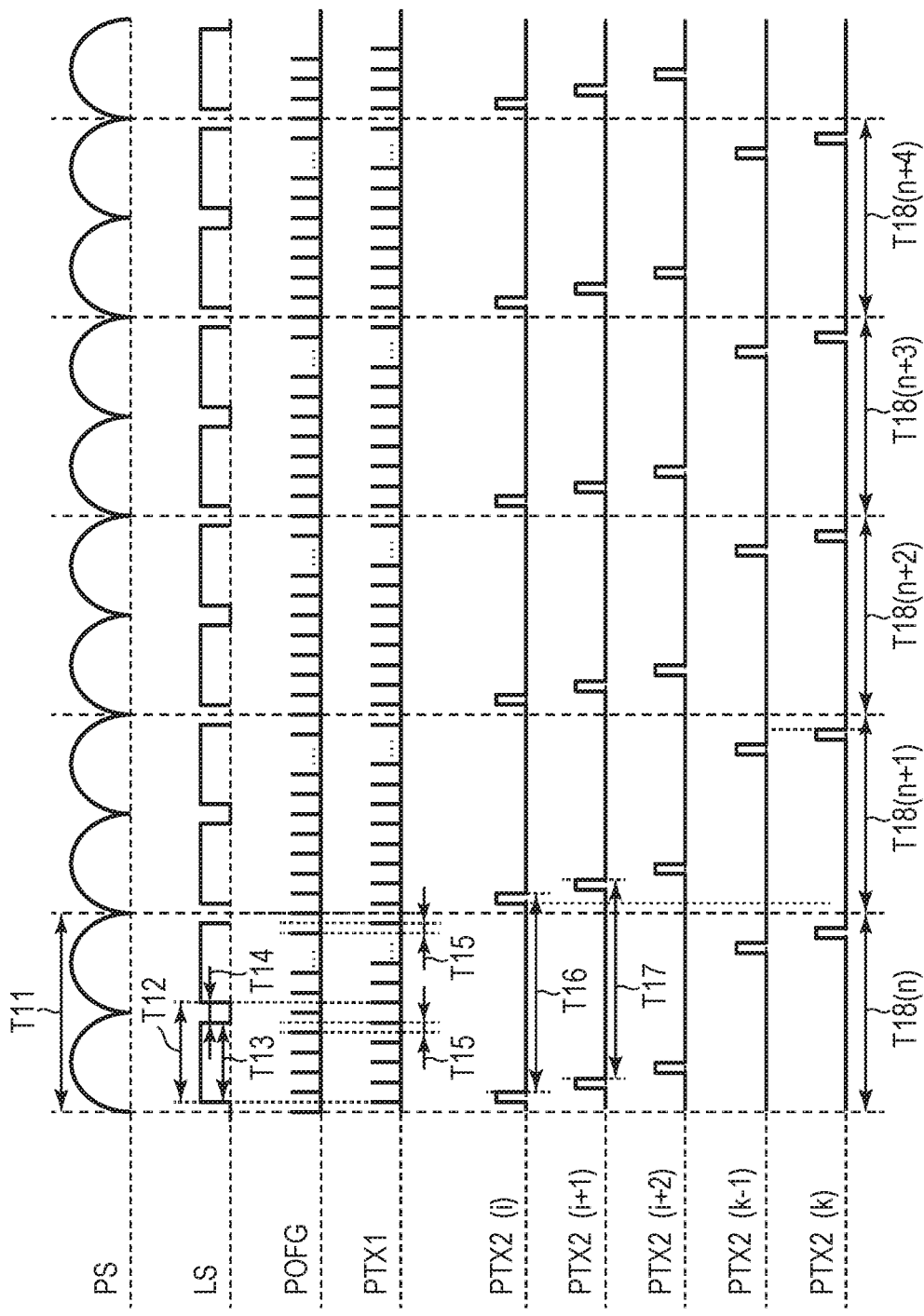

FIG. 4A and FIG. 4B are timing diagrams illustrating the operation of the imaging device 10 according to the first embodiment. FIG. 4A and FIG. 4B illustrate the process in acquiring an image of any one of the first image data and the second image data. FIG. 4A is a timing diagram illustrating the outline of a capturing process over a plurality of frames, and FIG. 4B is a timing diagram illustrating a process within one frame in more detail.

FIG. 4A illustrates timings of a power supply waveform PS, a light source waveform LS, and the control signals POFG, PTX1, PTX2($i$), PTX2($i$+1), PTX2($i$+2), PTX2($k$−1), and PTX2($k$). The power supply waveform PS of FIG. 4A schematically illustrates a waveform of full-wave-rectified AC power supply supplied to a light source such as an LED lamp that irradiates a subject. The AC power supply is a power supply that supplies power at a frequency of 50 Hz or 60 Hz, for example. The period T11 of FIG. 4A corresponds to a period of AC power supply and is ⅟50 seconds or ⅟60 seconds, for example.

The light source waveform LS of FIG. 4A illustrates a lighting state of a light source using the power supply of the power supply waveform PS. In the light source waveform LS, a high level indicates a turn-on state, and a low level indicates a turn-off state. When the power supply waveform PS is higher than or equal to a certain threshold, the light source waveform LS is in the high level, and the light source is in the turn-on state. On the other hand, when the power supply waveform PS is lower than the threshold, the light source waveform LS is in the low level, and the light source is in the turn-off state. As described above, the environmental light detection unit 205 acquires information on intensity variation of the environmental light and a cycle of turning on and off of the illumination light source. It is therefore possible to acquire the waveform itself of the light source waveform LS or the cycle of turning on and off or the like based on the light source waveform LS.

The period T12 indicates the cycle of turning on and off of the light source and is a cycle of a length of half the period T11 that is the cycle of the AC power supply. Further, the period T13 indicates a period in which the light source is turned on, and the period T14 indicates a period in which the light source is turned off.

The control signal POFG of FIG. 4A indicates a waveform of a pulse signal supplied to the gate of the drain transistor M6. Once the control signal POFG is controlled from the low level to the high level, the drain transistor M6 is switched on, and charges accumulated in the photoelectric conversion unit D1 are drained to a potential line that supplies a drain potential VOFD. In the present embodiment, since driving by the global electronic shutter scheme is performed, the control signal POFG is controlled from the high-state to the low-state at the same timing in all the pixels 111. Thereby, the drain transistors M6 transition from the on-state to the off-state at the same timing in all the pixels 111, and charge accumulation operations in the photoelectric conversion units D1 are started at the same timing in all the pixels 111. Note that, in this specification, "the same timing" is not required to be strictly the same time but may be substantially the same time to the degree that distortion of an image can be suppressed by the driving in the global electronic shutter scheme.

The control signal PTX1 of FIG. 4A indicates the waveform of a pulse signal supplied to the gate of the first transfer transistor M1. Once the control signal PTX1 is controlled from the low level to the high level, the first transfer transistor M1 is switched on, and charges accumulated by the photoelectric conversion unit D1 are transferred to the charge holding portion C1. In the present embodiment, since driving by the global electronic shutter scheme is performed, the control signals PTX1 are controlled from the high level to the low level at the same timing in all the pixels 111. Thereby, the first transfer transistors M1 are switched off at the same timing in all the pixels 111, and charge accumulation operations in the photoelectric conversion units D1 are stopped at the same timing in all the pixels 111.

The period T15 indicates a period from the start to the end of one time of charge accumulation (sampling period). In the present embodiment, multiple times of short time sampling operation are performed within one frame period. That is, the first transfer transistors M1 are switched on intermittently for multiple times at the same timing in all the pixels 111, and thereby charges are transferred intermittently for multiple times from the photoelectric conversion units D1 to the charge holding portions C1. Further, at the time when the first transfer transistors M1 are switched on, the drain transistors M6 are intermittently, repeatedly operated to be switched on and off so that the drain transistors M6 are switched off in all the pixels 111. In such a way, by causing the start and end timings of each sampling period to be matched on respective rows, it is possible to have the same exposure time period on respective rows.

The control signals PTX2($i$), PTX2($i$+1), . . . , and so on of FIG. 4A indicate waveforms of pulse signals supplied to the gates of the second transfer transistors M2. The value in parenthesis denotes a row number in the pixel array 110 supplied with each control signal. Once the control signal PTX2($i$) is controlled from the low level to the high level, the second transfer transistor M2 on the i-th row is switched on, and charges held in the charge holding portion C1 are transferred to the floating diffusion region FD. As illustrated in FIG. 4A, the control signals PTX2(i), PTX2(i+1), . . . , and so on are controlled to the high level sequentially on a row basis. Thereby, the second transfer transistors M2 are also sequentially switched on sequentially on a row basis, and charges held in the charge holding portion C1 are transferred to the floating diffusion region FD.

Here, the period T16 is a period from the start to the end of multiple times of transfer of charges, in other words, a period in which charges are held in the charge holding portion C1 on the i-th row. In the period T16, the first transfer transistor M1 is intermittently switched on for multiple times, and thereby charges are transferred from the photoelectric conversion unit D1 to the charge holding portion C1 for multiple times. Thus, it can also be said that the period T16 is a period in which charges held in the charge holding portion C1 are generated in the photoelectric conversion unit D1. Further, it can also be said that the period T16 corresponds to a period from the start of the first sampling operation to the end of the last sampling operation in the multiple times of sampling operations. In the present embodiment, with multiple times of transfer as described above, signal charges caused by multiple exposure are accumulated in the charge holding portion C1. Similarly, the period T17 indicates a period from the start of the first sampling operation to the end of the last sampling operation on the (i+1)-th row.

The periods T18(n), T18(n+1), . . . , and so on indicate a period of one frame. The value in the parenthesis denotes a frame number. In each of the periods T18(n), T18(n+1), . . . , and so on, the image data for one frame is output from the imaging element 100.

With reference to FIG. 4B, the relationship of respective control signals will be described in more detail. The control signals PRES(i) and PRES(i+1) of FIG. 4B indicate waveforms of pulse signals supplied to the gates of the reset transistors M3. The value in the parenthesis denotes a row number in the pixel array 110 supplied with each control signal. Once the control signal PRES(i) is controlled from the low level to the high level, the reset transistor M3 on the i-th row is switched on, and the potential of the floating diffusion region FD is reset. As illustrated in FIG. 4B, the control signals PRES(i) and PRES(i+1) are controlled to the high level sequentially on a row basis. Thereby, the reset transistors M3 also transition to the on-state sequentially on a row basis, and the potentials of the floating diffusion regions FD are reset. This reset is performed immediately before charges are transferred from the charge holding portions C1 to the floating diffusion regions FD on a row basis. Note that signal readout is performed by the column amplifier circuit 140 after reset by the reset transistor M3 and after transfer by the second transfer transistor M2. A signal read out after reset is used for noise reduction by correlated double sampling.

The period T15 indicates one time of sampling period as with FIG. 4A. The period T21 is a period in which readout on the i-th row is performed and readout of the i-th row is again performed, and the length thereof is the same as a period of one frame. The period T22 is a cycle in which signals on respective rows are sequentially read out, which indicates a vertical scanning cycle. In the present embodiment, multiple times of sampling are performed within the period T21 to realize multiple exposure. As described above, in the present embodiment, multiple times of sampling are performed, readout is performed after averaging inside the charge holding portion C1, and thereby multiple exposure is realized. Thereby, since signal charges in a turn-on state and a turn-off state of a light source are averaged, influence on image quality due to a flicker phenomenon is reduced.

Note that the length of the period T15 may be less than or equal to ½ the length of the period T12, for example. In such a case, even when any of the multiple times of sampling are performed in a turn-on state, another sampling in the same frame is highly likely to be performed in a turn-off state, which improves a reduction effect of influence of a flicker phenomenon due to multiple exposure. Further, the length of the period T15 may be set to be smaller than ½ the length of the period T12, such as ¼ the length of the period T12, ⅛ the length of the period T12, or the like, for example. In such a case, an effect of reducing influence of a flicker phenomenon is further improved.

The period T16 can have any length as long as it is set to be longer than the period T12, and the length of the period T16 may be significantly longer, such as twice or more the period T12, three times or more the period T12, or the like. In such a case, the effect of averaging signal charges at the turn-on state and the turn-off state of a light source increases, and an effect of reducing influence of a flicker phenomenon is further improved. Further, for example, the length of the period T16 may be an integral multiple of the cycle of turning on and off of the light source. In particular, when the frequency or the cycle are known as with the commercial power supply, it is easy to set the length of the period T16 to a natural-number multiple (integral multiple of one or greater) of a cycle of turning on and off of the light source. In such a case, since the number of times of turning on and off of the light source within the period T16 is constant, an effect of reducing influence of a flicker phenomenon is further improved.

Figure 5A:
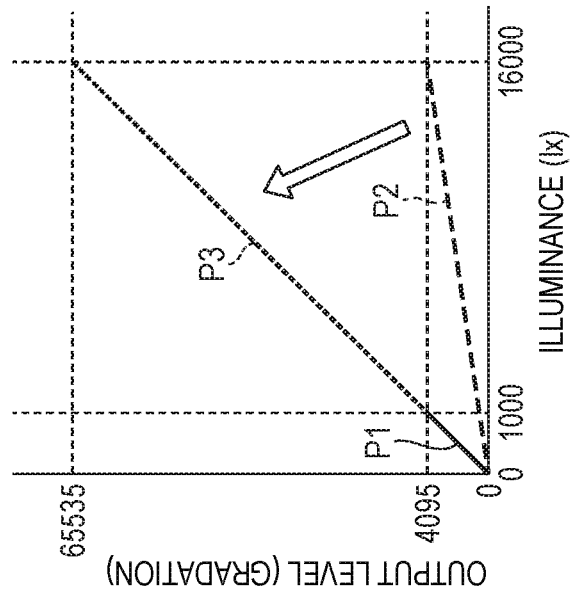
FIG. 5A and FIG. 5B are graphs illustrating an example of a relationship between the illuminance and the output level in a dynamic-range expansion process according to the first embodiment.
Figure 5B:
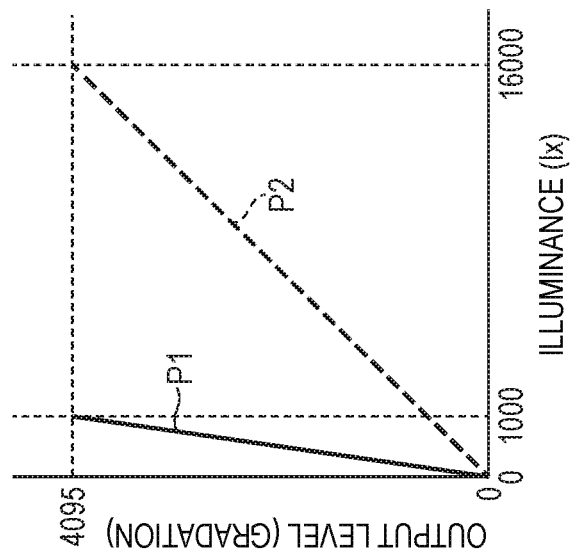

FIG. 5A and FIG. 5B are graphs illustrating examples of the relationship between the illuminance and the output level in a dynamic-range expansion process according to the first embodiment. With reference to FIG. 5A and FIG. 5B, the outline of a high dynamic range composition process performed by the image composition unit 206 will be described.

As one example of a high dynamic range composition process, a process for composing image data of a short exposure time period and image data of a long exposure time period will be described. Here, the number of gradations of the two image data is 4096 (12 bits), and the number of gradations of composed image data is a value corresponding to 65536 (16 bits). In such a case, the dynamic range is expanded from a value corresponding to 72 dB to a value corresponding to 96 dB.

FIG. 5A is a graph illustrating the relationship between the illuminance and the output level (gradation) before image composition. The property P1 is mainly used for capturing a dark region of a subject and is the output level property to the illuminance in capturing an image of a long exposure time period. The property P2 is mainly used for capturing a bright region of a subject and is the output level property to the illuminance in capturing an image of a short exposure time period. The slope of the property P2 is gentler than the slope of the property P1. Here, the exposure time period in the property P1 is 16 times the exposure time period in the property P2. More specifically, while the output level in capturing an image of the long exposure time period reaches 4095 gradations when the illuminance is 1000 lux (1×), the output level in capturing an image of the short exposure time period is set so as to reach 4095 gradations when the illuminance is 16000 1×, which is 16 times.

First, an image in which the bits of image data of the short exposure time period have been digitally shifted by 4 bits to the higher bit side is created. Thereby, image data captured at short time exposure corresponds to 16-bit data of 65536 gradations. Next, the shifted image data of the short exposure time period and the image data of the long exposure time period are composed. This composition process may be to use image data of the long exposure time period at a gradation value that is less than or equal to a certain threshold and use the shifted image data of the short exposure time period at a gradation value that is greater than the certain threshold. Thereby, 16-bit image data having an expanded dynamic range is generated. In this example, the threshold corresponds to 4095 gradations.

FIG. 5B is a graph illustrating a relationship between the illuminance and the output level (gradation) after image composition. The property P1 is less than or equal to the threshold of 4095 gradations and thus is the same as the property related to an image of the long exposure time period. The property P3 is greater than the threshold of 4095 gradations and thus is the same as the property related to the shifted image data of the short exposure time period. The property P3 is resulted by shifting the property P2 by 4 bits to the higher bit side. The property of the composed image corresponds to a property obtained by connecting the property P1 and the property P3. Thereby, the composed image has a saturation level increased by 16 times while having 16-bit gradation accuracy and thus is an image having an expanded dynamic range. While the ratio of an exposure time period is 16 times in this example, it is also possible to obtain an image having a high dynamic range of 100 dB or greater by setting a larger ratio of an exposure time period.

According to the present embodiment, by combining the multiple exposure described above and the dynamic-range expansion resulted by image composition, it is possible to realize high quality capturing that achieves both a reduction of influence on image quality due to a flicker phenomenon and a dynamic-range expansion.

Since charges transferred for multiple times are added in the charge holding portion C1 in multiple exposure, however, noise due to pixel defect, fixed pattern noise, in-plane unevenness, or the like may be superimposed in accordance with the number of times of multiple exposure, and the image quality may deteriorate. In particular, in an image after the dynamic-range expansion described above, a use of multiple exposure for capturing a portion corresponding to a dark part of the image results in significant of deterioration of image quality. Accordingly, in the present embodiment, the gradation compression unit 204 performs a process of gradation compression before performing image composition of a dynamic-range expansion on an image obtained after multiple exposure. The gradation compression unit 204 compresses the gradation of the second image data of long-time exposure obtained by multiple exposure. Thereby, the noise level due to pixel defect or the like is reduced.

Figure 8B:
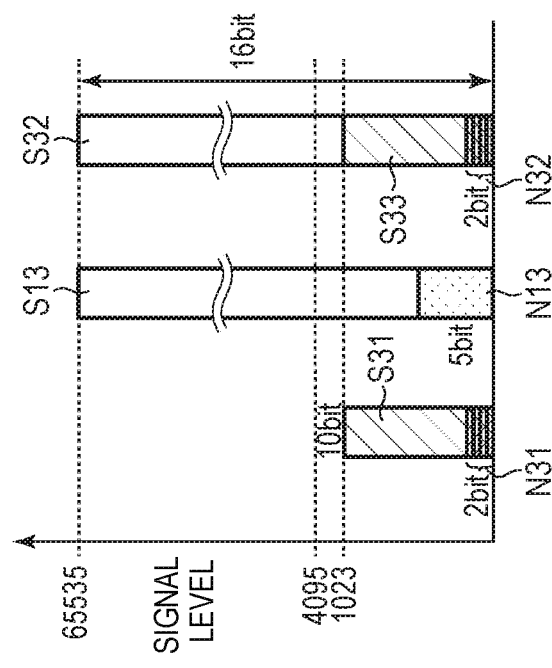
FIG. 8A, FIG. 8B and FIG. 8C are schematic diagrams illustrating a dynamic-range expansion process according to the first embodiment.
Figure 8C:
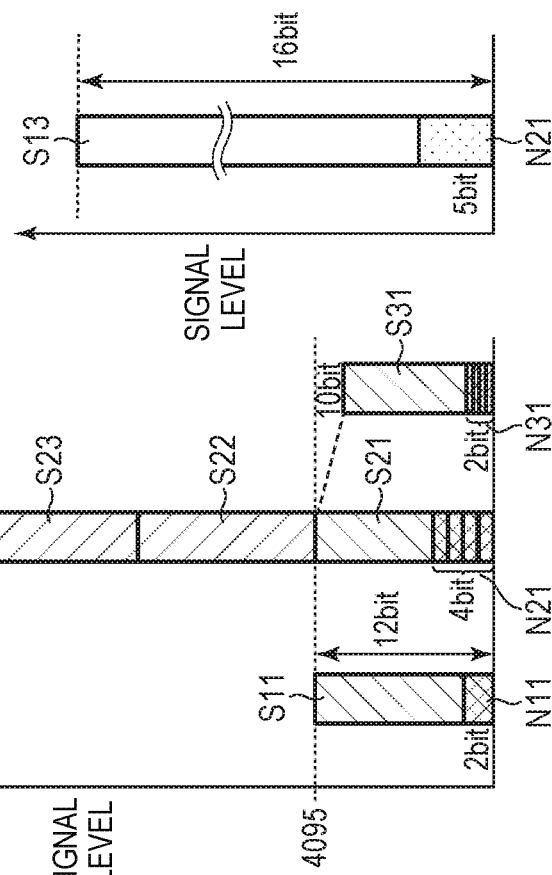
Figure 8A:
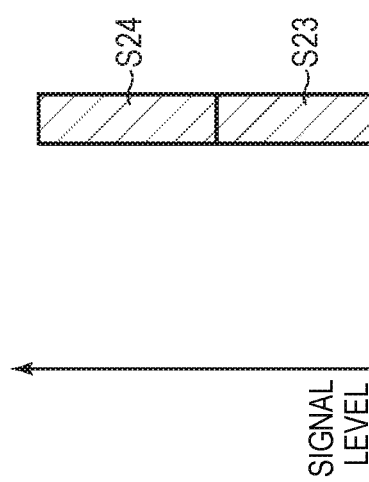

FIG. 6A to FIG. 6C are schematic diagrams illustrating a dynamic-range expansion process according to a first comparative example. FIG. 7A to FIG. 7C are schematic diagrams illustrating a dynamic-range expansion process according to a second comparative example. FIG. 8A to FIG. 8C are schematic diagrams illustrating a dynamic-range expansion process according to the first embodiment. With reference to these drawings, the effect and advantage of dynamic-range expansion, multiple exposure, and gradation compression will be described.

First, the first comparative example will be described. The first comparative example illustrated in FIG. 6A to FIG. 6C is an example when neither control of multiple exposure by the multiple exposure control unit 203 nor gradation compression by the gradation compression unit 204 is performed. FIG. 6A to FIG. 6C are schematic diagram illustrating change in the signal level at the time of a dynamic-range expansion process in the first comparative example.

FIG. 6A is a schematic diagram of the signal level of the second image data of long-time exposure acquired by the long-time exposure image acquisition unit 202. In the same manner as the examples of FIG. 5A and FIG. 5B, the imaging element 100 outputs a digital signal of 12 bits (4096 gradations). At this time, in the second image data, a noise component N11 corresponding to 2 bits is included in the signal component S11 as illustrated in FIG. 6A.

FIG. 6B is a schematic diagram of the signal level of the first image data of short-time exposure acquired by the short-time exposure image acquisition unit 201. The imaging element 100 outputs a digital signal of 12 bits (4096 gradations) in the same manner as the case of long-time exposure. At this time, in the first image data, a noise component N12 corresponding to 1 bit is included in the signal component S12 as illustrated in FIG. 6B. The image composition unit 206 shifts the bits of the first image data by 4 bits to the higher bit side. The signal component S13 indicates a signal component after the bit shift, and the noise component N13 indicates a noise component after the bit shift. Due to the bit shift by 4 bits, the level of the noise component N13 is increased from a level corresponding to 1 bit to a level corresponding to 5 bits.

FIG. 6C is a schematic diagram of the signal level before and after composition in the image composition unit 206. In the first comparative example, since no gradation compression is performed in the gradation compression unit 204, the second image data of long-time exposure is directly composed with the first image data of short-time exposure on which the bit shift by 4 bits has been performed. The first image data of short-time exposure is used for the signal component S14 within the range that is greater than or equal to 4095 gradations in the composed output signal. Further, the second image data of long-time exposure is used for the signal component S15 within the range that is less than 4095 gradations in the composed output signal. The noise component N14 included in the composed output signal is the same as the noise component N11 included in the second image data of long-time exposure. Therefore, the level of the noise component N14 corresponds to 2 bits. Since no multiple exposure is performed in this example, there is no increase of noise due to multiple exposure. In the configuration of the first comparative example, however, deterioration of image quality due to a flicker phenomenon may occur as described above.

Next, the second comparative example will be described. The second comparative example illustrated in FIG. 7A to FIG. 7C is an example when control of multiple exposure by the multiple exposure control unit 203 is performed but no gradation compression by the gradation compression unit 204 is performed. FIG. 7A to FIG. 7C are schematic diagrams illustrating change in the signal level at the time of a dynamic-range expansion process in the second comparative example.

FIG. 7A is a schematic diagram of the signal level of the second image data of long-time exposure acquired by the long-time exposure image acquisition unit 202. In the same manner as the examples of FIG. 5A and FIG. 5B, the imaging element 100 outputs a digital signal of 12 bits (4096 gradations). At this time, as illustrated in the left side in FIG. 7A, the signal component S11 including the noise component N11 corresponding to 2 bits occurs for one time of exposure.

In this example, when the number of times of multiple exposure is four, the signal components S21, S22, S23, and S24 occur on the right side in FIG. 7A by four times of exposure, and a signal of the sum of these signal components is output as the second image data. At this time, since the output range of the imaging element 100 corresponds to 12 bits (4096 gradations), all the output levels that are greater than or equal to 4095 are clipped at the upper limit value of 4095. The level of the noise component N21 occurring at this time is four times the level of the noise component N11 for one time of exposure and thus is increased to a level corresponding to 4 bits.

FIG. 7B is a schematic diagram of the signal level of the first image data of short-time exposure acquired by the short-time exposure image acquisition unit 201. Since this is the same as the first comparative example, the description thereof will be omitted.

FIG. 7C is a schematic diagram of the signal level before and after composition in the image composition unit 206. Also in the second comparative example, since no gradation compression in the gradation compression unit 204 is performed, the second image data of long-time exposure is directly composed with the first image data of short-time exposure on which the bit shift by 4 bits has been performed. Also in this case, in the same manner as the first comparative example, the noise component N22 included in the composed output signal is the same as the noise component N21 included in the second image data of long-time exposure. Therefore, the level of the noise component N22 corresponds to 4 bits. In this example, while influence of a flicker phenomenon is reduced by performing multiple exposure, an increase in the level of the noise component N22 may cause a problem.

Next, change in the noise component in the configuration of the present embodiment will be described. Examples illustrated in FIG. 8A to FIG. 8C are examples corresponding to the present embodiment and illustrate a case where control of multiple exposure by the multiple exposure control unit 203 is performed and gradation compression by the gradation compression unit 204 is performed. FIG. 8A to FIG. 8C are schematic diagram illustrating change in the signal level at the time of a dynamic-range expansion process in the present embodiment.

FIG. 8A is a schematic diagram of the signal level of the second image data of long-time exposure acquired by the long-time exposure image acquisition unit 202 and a schematic diagram of the signal level of the third image data that has been compressed by the gradation compression unit 204. The signal level of the second image data illustrated on the left side and at the center in FIG. 8A is the same as that in FIG. 7A. The right side of FIG. 8A illustrates the signal level of the third image data that has been compressed by the gradation compression unit 204. In this process, a process for compressing 12-bit data into 10-bit data is performed. Specifically, this compression process may be to shift the bits of data by 2 bits to the lower bit side or may be to divide data by a coefficient of 4. As a result of this process, the gradation value of the signal component S31 of the third image data is reduced to ¼, and the number of gradations is reduced to 1024. At this time, the level of the noise component N31 is also reduced from a level corresponding to 4 bits to a level corresponding to 2 bits. Therefore, the number of gradations is reduced by performing a process of gradation compression by the gradation compression unit 204, and thereby noise that has increased due to multiple exposure is reduced.

FIG. 8B is a schematic diagram of the signal level of the first image data of short-time exposure acquired by the short-time exposure image acquisition unit 201. Since this is the same as the first comparative example and the second comparative example, the description thereof will be omitted.

FIG. 8C is a schematic diagram of the signal level before and after composition in the image composition unit 206. In the present embodiment, the third image data generated by gradation compression in the gradation compression unit 204 and the first image data of short-time exposure on which the bit shift by 4 bits has been performed are composed. The noise component N32 included in the composed output signal is the same as the noise component N31 included in the third image data obtained after gradation compression. Therefore, the level of the noise component N32 corresponds to 2 bits and is equal to the initial noise component N11. In the present embodiment, influence of a flicker phenomenon is reduced because multiple exposure is performed. Furthermore, influence of an increase of noise due to multiple exposure is also mitigated by gradation compression.

Figure 9:
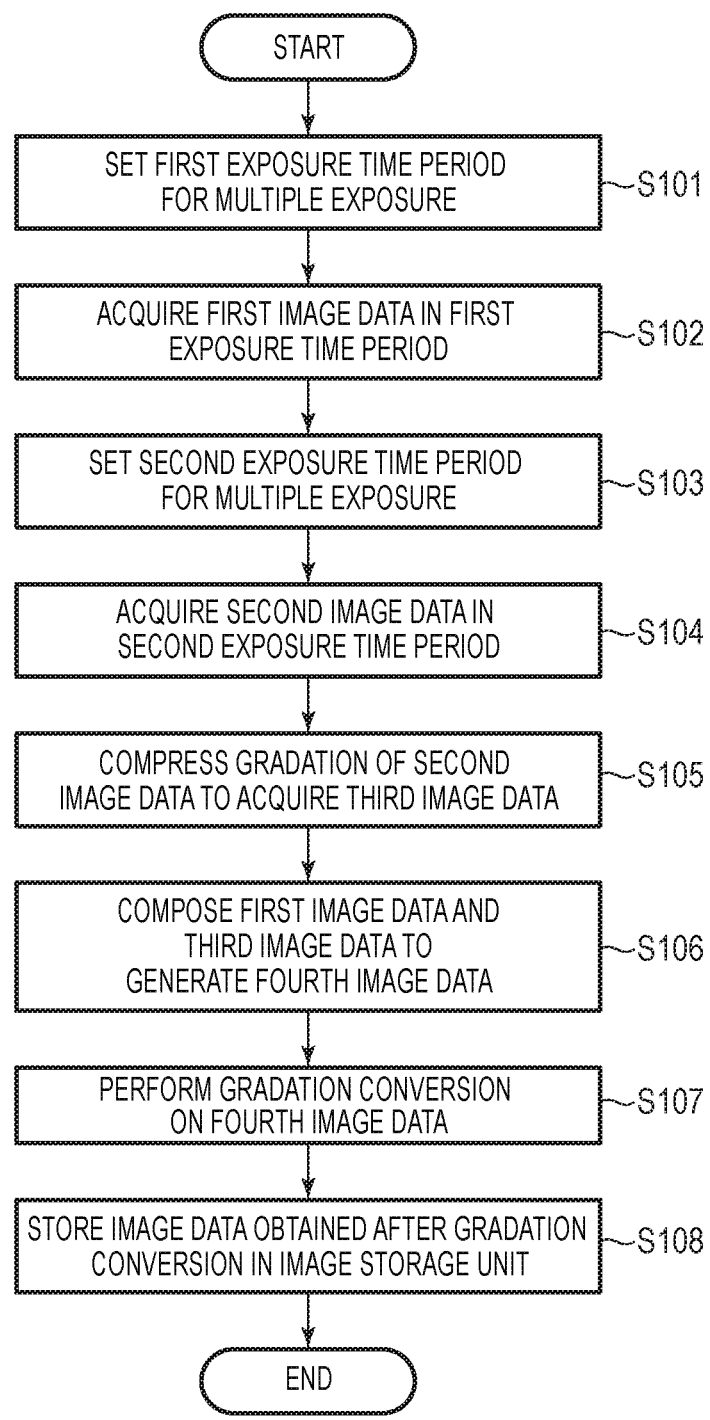
FIG. 9 is a flowchart illustrating an operation of the imaging device according to the first embodiment.

FIG. 9 is a flowchart illustrating the operation of the imaging device 10 according to the first embodiment. The operation of the imaging device 10 will be described with reference to FIG. 9. With respect to the process that has been illustrated in the above description, the description thereof will be omitted or simplified.

In step S101, the multiple exposure control unit 203 transmits a multiple-exposure control signal to the imaging element 100 to set the first exposure time period used for short-time exposure based on environmental light information acquired by the environmental light detection unit 205.

In step S102, the imaging element 100 performs capturing by short-time exposure and outputs the first image data. The short-time exposure image acquisition unit 201 then acquires the first image data of short-time exposure from the imaging element 100.

In step S103, the multiple exposure control unit 203 transmits a multiple-exposure control signal to the imaging element 100 to set the second exposure time period used for long-time exposure based on environmental light information acquired by the environmental light detection unit 205.

In step S104, the imaging element 100 performs capturing by long-time exposure and outputs the second image data. The long-time exposure image acquisition unit 202 then acquires the second image data of long-time exposure from the imaging element 100. In step S105, the gradation compression unit 204 performs gradation compression to reduce the number of gradations of the second image data and generates and acquires the third image data. At this time, the gradation compression unit 204 controls a compression ratio of the acquired long-time exposure image by using a control signal defined by the multiple exposure control unit 203 based on the environmental light information acquired by the environmental light detection unit 205.

In step S106, the image composition unit 206 composes the first image data and the third image data. Thereby, so-called high dynamic range composition is performed, and the fourth image data having a wide dynamic range is generated. In step S107, the gradation conversion unit 207 performs gradation conversion of the fourth image data so as to have an image suitable for a narrow dynamic range of a device of the output system such as the image storage unit 208. In step S108, the image storage unit 208 stores image data obtained after gradation conversion. Note that, at capturing of a moving image, the process from step S101 to step S108 is continuously repeated, and a moving image file is generated.

In the present embodiment, the imaging element 100 outputs the first image data of short-time exposure and the second image data of long-time exposure. Here, at least the long-time exposure is multiple exposure in which charges are transferred from the photoelectric conversion unit D1 to the charge holding portion C1 for multiple times. The gradation compression unit 204 reduces the gradation value of the second image data to generate the third image data. In such a way, the imaging device 10 of the present embodiment can reduce influence of a flicker phenomenon while maintaining image quality and acquire a plurality of images (the first image data and the third image data) of different exposure time periods. Further, since the first image data and the third image data acquired by the imaging device 10 are used for high dynamic range composition, a high quality, high dynamic range image can be generated in accordance with the present embodiment.

Note that, while at least the second image data may be generated by multiple exposure in the present embodiment, it is desirable that both the first image data and the second image data be generated by multiple exposure. In such a case, influence of flicker reduction can be suppressed in both a portion of a small gradation value and a portion of a large gradation value in an image.

Further, while elements other than the imaging element 100 (such as the image composition unit 206) are depicted as being provided outside the imaging element 100 in FIG. 3, some or all of these elements may be provided inside the imaging element 100. Further, some or all of the image composition unit 206, the gradation conversion unit 207, and the image storage unit 208 may be provided in an image processing apparatus outside the imaging device 10.

Second Embodiment

A second embodiment of the present invention will be described. A difference of the present embodiment from the first embodiment is that acquisition of the first image data of short-time exposure and acquisition of the second image data of long-time exposure may be performed in the same frame. In the first embodiment, the imaging element 100 has a circuit configuration that is not provided for outputting the first image data of short-time exposure and the second image data of long-time exposure in the same frame period. Thus, in the first embodiment, it is necessary to divide a frame and read out image data by a method of outputting the first image data of short-time exposure in one frame and outputting the second image data of long-time exposure in another frame. In contrast, in the present embodiment, by providing a plurality of charge holding portions in each pixel, it is possible to perform acquisition of the first image data of short-time exposure and acquisition of the second image data of long-time exposure in the same frame. In the following description, the description of features common to the first embodiment will be omitted as appropriate.

Figure 10:
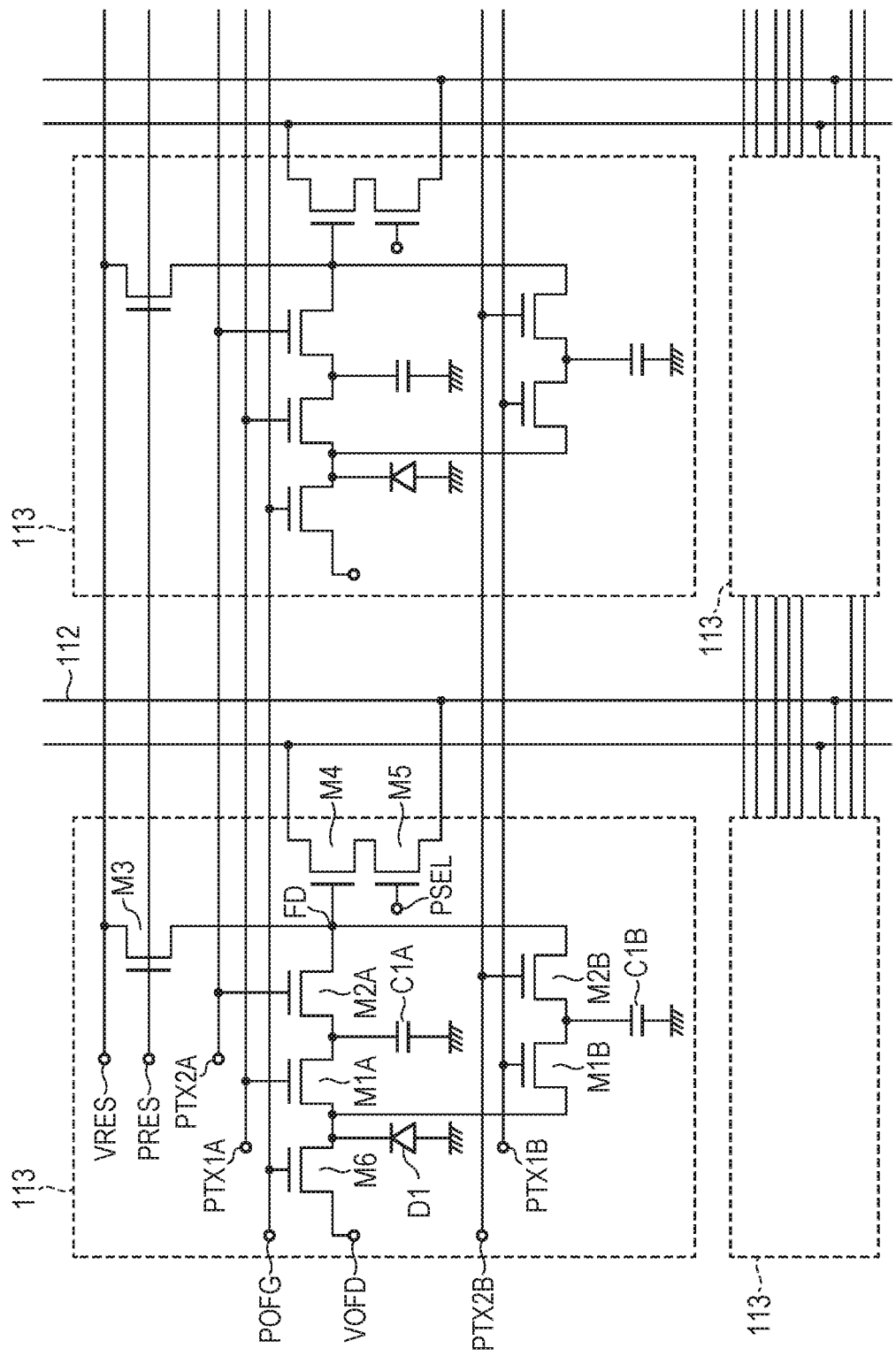
FIG. 10 is a diagram illustrating a circuit configuration of pixels according to a second embodiment.

FIG. 10 is a diagram illustrating a circuit configuration of the pixels 113 according to the second embodiment. The present embodiment is different from the first embodiment in that two first transfer transistors, two charge holding portions, and two second transfer transistors are provided inside each pixel 113. That is, in the pixel 113, first transfer transistors M1A and M1B, charge holding portions C1A and C1B, and second transfer transistors M2A and M2B are provided instead of the first transfer transistor M1, the charge holding portion C1, and the second transfer transistor M2 of the first embodiment.

The sources of the first transfer transistors M1A and M1B are both connected to the cathode of the photoelectric conversion unit D1 and the source of the drain transistor M6. The drain of the first transfer transistor M1A is connected to the source of the second transfer transistor M2A. The parasitic capacitance between the drain of the first transfer transistor M1A and the source of the second transfer transistor M2A forms the charge holding portion C1A. The drain of the first transfer transistor M1B is connected to the source of the second transfer transistor M2B. The parasitic capacitance between the drain of the first transfer transistor M1B and the source of the second transfer transistor M2B forms the charge holding portion C1B. The drains of the second transfer transistor M2A and M2B are both connected to the source of the reset transistor M3 and the gate of the amplification transistor M4. The vertical scanning circuit 120 supplies control signals PTX1A and PTX1B to the gates of the first transfer transistors M1A and M1B, respectively. Further, the vertical scanning circuit 120 supplies control signals PTX2A and PTX2B to the gates of the second transfer transistors M2A and M2B, respectively.

With such a configuration, even in a state where charges are held in the charge holding portion C1A, charges can be further transferred to the charge holding portion C1B. Thus, signals different from each other in the same frame can be held in the charge holding portions C1A and C1B. Further, since the first transfer transistors M1A and M1B are separately provided to the charge holding portions C1A and C1B, sampling operations having different exposure time periods can be sequentially performed on the charge holding portions C1A and C1B within the same frame period. In other words, the imaging device 10 of the present embodiment can acquire the first image data and the second image data in the same frame period.

Figure 11:
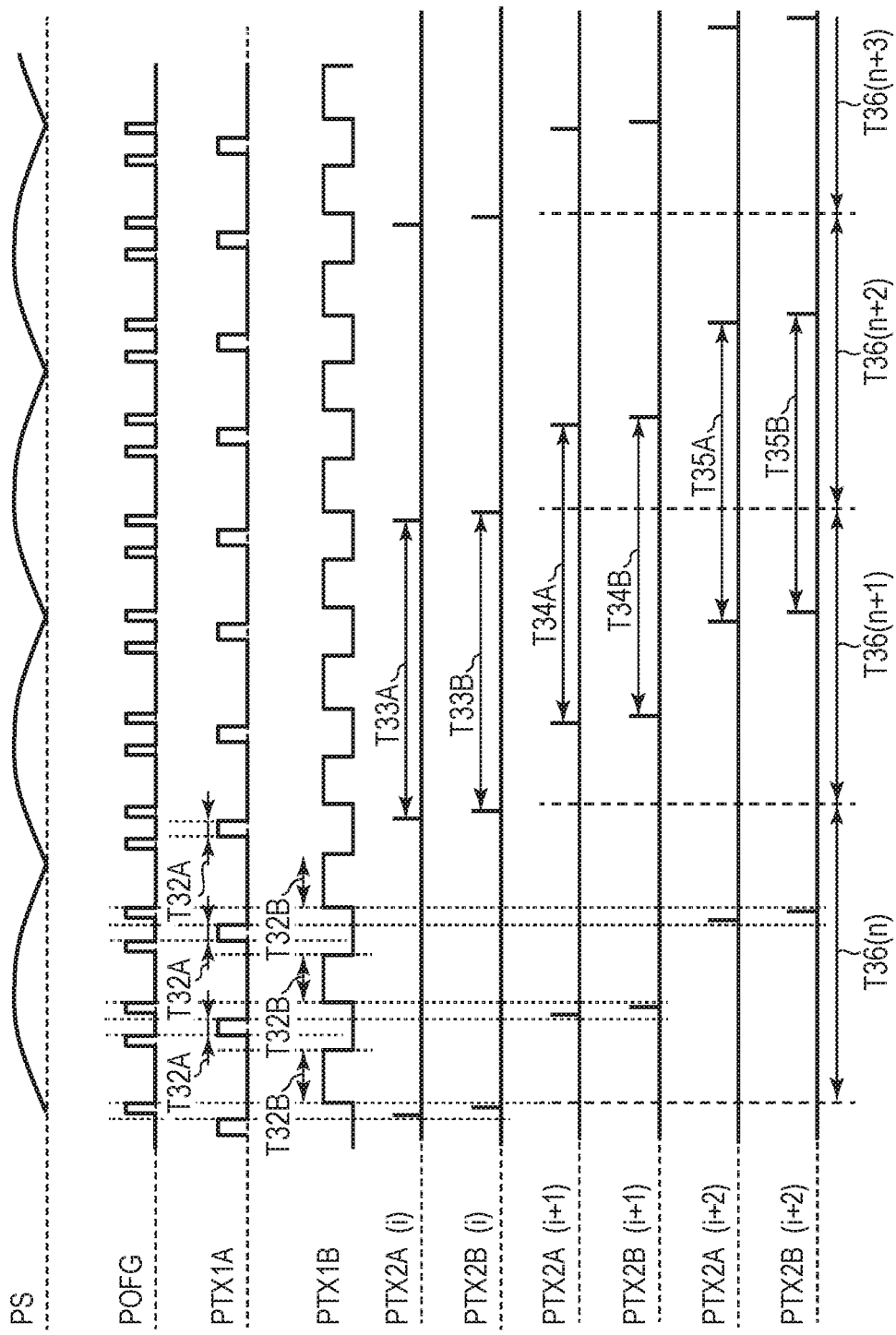
FIG. 11 is a timing diagram illustrating an operation of an imaging device according to the second embodiment.

FIG. 11 is a timing diagram illustrating the operation of the imaging device 10 according to the second embodiment. FIG. 11 illustrates the power supply waveform PS and the timings of control signals POFG, PTX1A, PTX1B, PTX2A (i), PTX2B(i), PTX2A(i+1), PTX2B(i+1), PTX2A(i+2), and PTX2B(i+2). The value in the parenthesis denotes a row number of the pixel array 110 in the same manner as in the first embodiment. Since the power supply waveform PS and the light source supplied with power based on the power supply waveform PS are the same as those in the first embodiment, the description thereof will be omitted.

Once the control signal POFG is controlled from the low level to the high level, the drain transistor M6 is switched on, and charges accumulated in the photoelectric conversion unit D1 are drained to the potential line that supplies the drain potential VOFD. When the control signal PTX1A is controlled from the low level to the high level, the first transfer transistor M1A is switched on, and charges accumulated in the photoelectric conversion unit D1 are transferred to the charge holding portion C1A. When the control signal PTX1B is controlled from the low level to the high level, the first transfer transistor M1B is switched on, and charges accumulated in the photoelectric conversion unit D1 are transferred to the charge holding portion C1B. Also in the present embodiment, since driving by the global electronic shutter scheme is performed in the same manner as in the first embodiment, the levels of the control signals POFG, PTX1A, and PTX1B change at the same timing in all the pixels 113.

The periods T32A and T32B indicate periods from the start to the end of one time of charge accumulation (sampling periods). The period T32A is a sampling period for charges which are transferred to and held in the charge holding portion C1A, and the period T32B is a sampling period for charges which are transferred to and held in the charge holding portion C1B.

As illustrated in FIG. 11, the length of the period T32B is longer than the length of the period T32A. Thus, charges of different accumulation time periods are accumulated in the charge holding portions C1A and C1B. That is, the period T32A is a sampling period corresponding to short-time exposure, and the period T32B is a sampling period corresponding to long-time exposure. Thereby, sampling operations of different exposure time periods can be performed within the same frame period.

While the period T32A and the period T32B are arranged alternately and do not overlap with each other in FIG. 11, a part of these periods may overlap as along as the lengths of the period T32B and the period T32A are different from each other. Further, while the cycle that the control signal PTX1A is controlled to the high level and the cycle that the control signal PTX1B is controlled to the high level are the same in FIG. 11, these cycles may be different from each other. In such a case, image data resulted from the numbers of times of multiple exposure that are different between short-time exposure and long-time exposure are obtained, which is also tolerated.

When the control signal PTX2A(i) is controlled to the high level, the second transfer transistor M2A on the i-th row is switched on, and charges held in the charge holding portion CIA are transferred to the floating diffusion region FD. Further, the control signal PTX2B(i) is changed to the high level, the second transfer transistor M2B on the i-th row is switched on, and charges held in the charge holding portion C1B are transferred to the floating diffusion region FD.

The period T33A is a period in which charges are held in the charge holding portion C1A on the i-th row, and the period T33B is a period in which charges are held in the charge holding portion C1B on the i-th row. Since the first transfer transistors M1A and M1B are switched on intermittently for multiple times during the periods T33A and T33B and thereby multiple times of sampling are performed, multiple exposure is realized in the same manner as in the first embodiment. Thereby, influence of a flicker phenomenon is reduced in the same manner as in the first embodiment. In this example, three times of sampling are performed in the periods T33A and T33B, respectively. The period T36($n$), T36($n$+1), . . . , and so on indicate one-frame periods. The value in the parenthesis denotes a frame number. In each of the period T36($n$), T36($n$+1), . . . , and so on, image data for one frame is output from the imaging element 100.

In the present embodiment, the first image data of short-time exposure and the second image data of long-time exposure can be generated in the same manner as in the first embodiment, which is configured to be able to realize multiple exposure in the same manner as in the first embodiment. The imaging device 10 of the present embodiment can reduce influence of a flicker phenomenon while maintaining image quality and acquire a plurality of images of different exposure time periods (the first image data and the third image data) in the same manner as in the first embodiment. Furthermore, in the present embodiment, acquisition of the first image data of short-time exposure and acquisition of the second image data of long-time exposure can be performed in the same frame. Thereby, the capturing time of two images used for high dynamic range composition can be closer, and an advantage of more improved quality of a composed image can be obtained.

Third Embodiment

Figure 12:
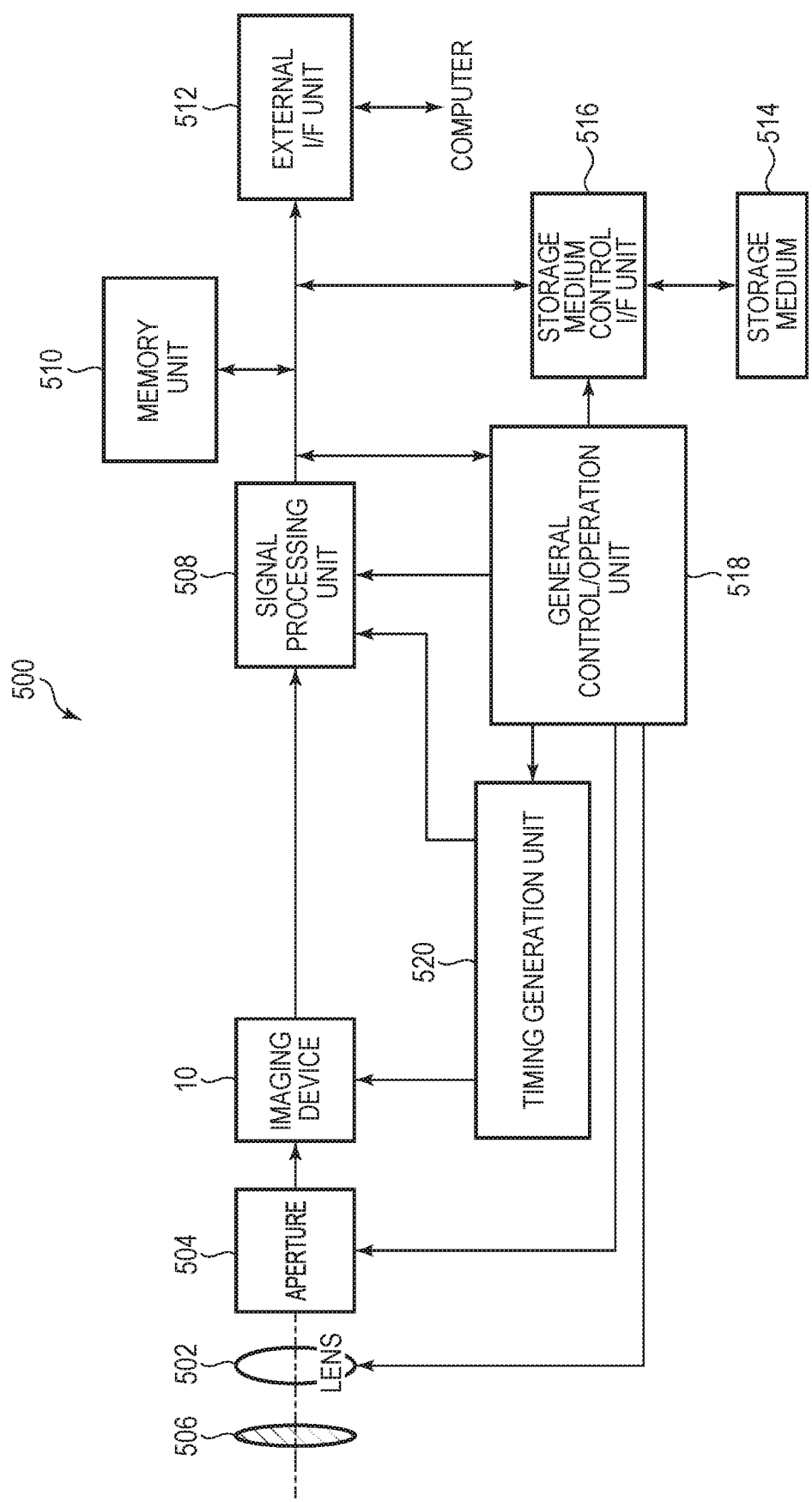
FIG. 12 is a block diagram illustrating a configuration example of an imaging system according to a third embodiment.

Next, an example of an apparatus to which the imaging device according to the embodiments described above is applied will be described. FIG. 12 is a block diagram illustrating a configuration of the imaging system 500 according to the present embodiment. The imaging device 10 illustrated in FIG. 12 is any of the imaging devices 10 described in the above first or second embodiment. An example of the imaging system 500 to which the imaging device 10 can be applied may be, for example, a digital camera, a digital camcorder, a surveillance camera, or the like. FIG. 12 illustrates a configuration example of a digital camera to which the imaging device 10 described in the above embodiments is applied.

An imaging system 500 illustrated as an example in FIG. 12 has an imaging device 10, a lens 502 that captures an optical image of a subject onto the imaging device 10, an aperture 504 for changing a light amount passing through the lens 502, and a barrier 506 for protecting the lens 502. The lens 502 and the aperture 504 form an optical system that converges a light onto the imaging device 10.

The imaging system 500 further has a signal processing unit 508 that processes an output signal output from the imaging device 10. The signal processing unit 508 performs an operation of signal processing for performing various correction or compression on an input signal, if necessary, and outputting the signal.

The imaging system 500 further has a buffer memory unit 510 for temporarily storing image data therein and an external interface unit (external I/F unit) 512 for communicating with an external computer or the like. The imaging system 500 further has a storage medium 514 such as a semiconductor memory for performing storage or readout of imaging data and a storage medium control interface unit (storage medium control I/F unit) 516 for performing storage or readout on the storage medium 514. Note that the storage medium 514 may be embedded in the imaging system 500 or may be removable.

The imaging system 500 further has a general control/operation unit 518 that performs various calculation and controls the entire digital camera and a timing generation unit 520 that outputs various timing signals to the imaging device 10 and the signal processing unit 508. Here, the timing signal or the like may be input from the outside, and the imaging system 500 may have at least the imaging device 10 and the signal processing unit 508 that processes an output signal output from the imaging device 10. The general control/operation unit 518 and the timing generation unit 520 may be configured to perform a part or all of the function related to control of the imaging device, such as generation of the control signal, generation of the reference voltage, or the like in the embodiments described above.

The imaging device 10 outputs an imaging signal to the signal processing unit 508. The signal processing unit 508 performs predetermined signal processing on an imaging signal output from the imaging device 10 and outputs image data. Further, the signal processing unit 508 uses an imaging signal to generate an image.

As described above, the imaging system 500 of the present embodiment includes the imaging device 10 according to the first or second embodiment. Accordingly, the imaging system 500 that enables higher quality capturing can be realized.

Fourth Embodiment

Figure 13A:
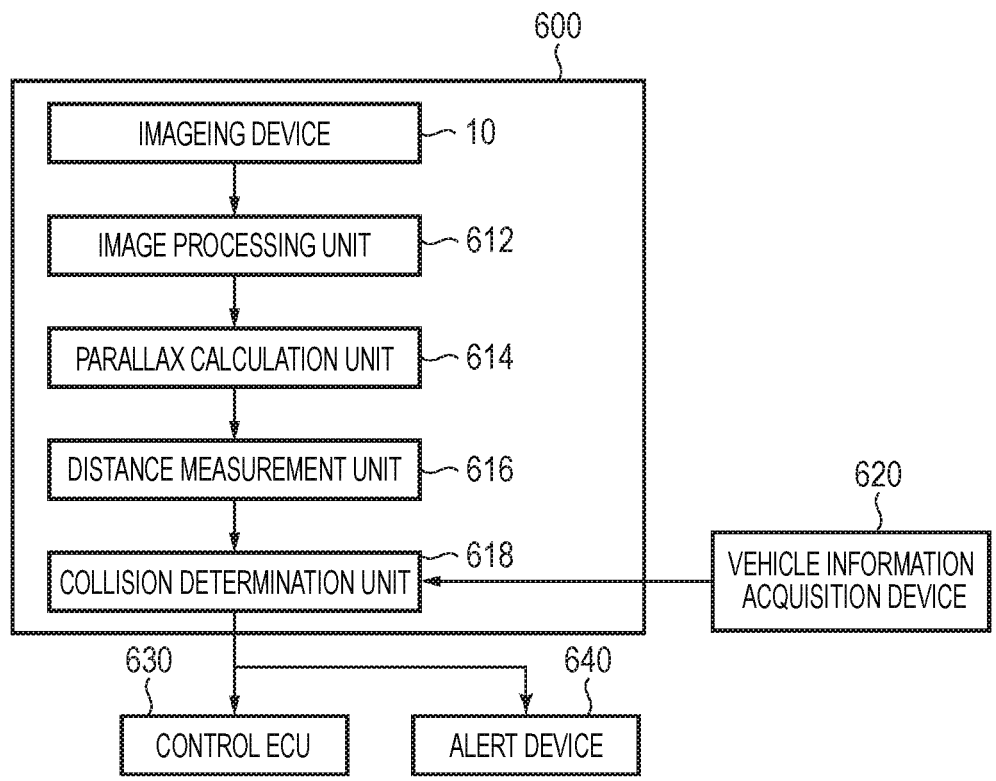
FIG. 13A and FIG. 13B are diagrams illustrating a configuration example of an imaging system and a mobile apparatus according to a fourth embodiment.
Figure 13B:
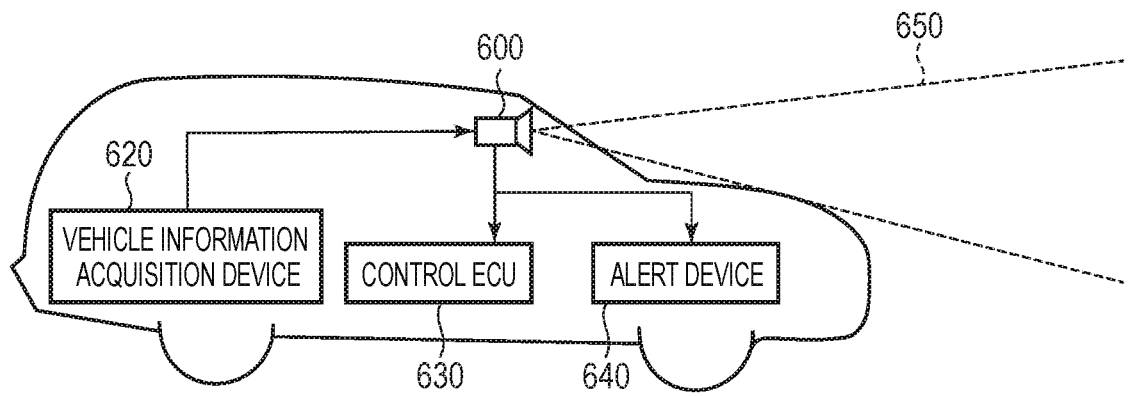

FIG. 13A and FIG. 13B are diagrams illustrating the configuration of an imaging system 600 and a mobile apparatus according to the present embodiment. FIG. 13A illustrates an example of the imaging system 600 related to an on-vehicle camera. An imaging system 600 has an imaging device 10 described in any of the above first or second embodiment. The imaging system 600 has an image processing unit 612 that performs image processing on a plurality of image data acquired by the imaging device 10 and a parallax calculation unit 614 that calculates a parallax (a phase difference of parallax images) from the plurality of image data acquired by the imaging system 600. Further, the imaging system 600 has a distance measurement unit 616 that calculates a distance to the object based on the calculated parallax and a collision determination unit 618 that determines whether or not there is a collision possibility based on the calculated distance. Here, the parallax calculation unit 614 and the distance measurement unit 616 are an example of a distance information acquisition unit that acquires distance information on the distance to the object. That is, the distance information is information on a parallax, a defocus amount, a distance to an object, or the like. The collision determination unit 618 may use any of the distance information to determine the collision possibility. The distance information acquisition unit may be implemented by dedicatedly designed hardware or may be implemented by a software module. Further, the distance information acquisition unit may be implemented by a Field Programmable Gate Array (FPGA), an Application Specific Integrated Circuit (ASIC), or the like or may be implemented by a combination thereof.

The imaging system 600 is connected to the vehicle information acquisition device 620 and can acquire vehicle information such as a vehicle speed, a yaw rate, a steering angle, or the like. Further, the imaging system 600 is connected to a control ECU 630, which is a control device that outputs a control signal for causing a vehicle to generate braking force based on a determination result by the collision determination unit 618. That is, the control ECU 630 is one example of a mobile apparatus control unit that controls a mobile apparatus based on the distance information. Further, the imaging system 600 is also connected to an alert device 640 that issues an alert to the driver based on a determination result by the collision determination unit 618. For example, when the collision probability is high as the determination result of the collision determination unit 618, the control ECU 630 performs vehicle control to avoid a collision or reduce damage by applying a brake, pushing back an accelerator, suppressing engine power, or the like. The alert device 640 alerts a user by sounding an alert such as a sound, displaying alert information on a display of a car navigation system or the like, providing vibration to a seat belt or a steering wheel, or the like.

In the present embodiment, an area around a vehicle, for example, a front area or a rear area is captured by using the imaging system 600. FIG. 13B illustrates the imaging system 600 when a front area of a vehicle (a capturing area 650) is captured. The vehicle information acquisition device 620 transmits an instruction to operate the imaging system 600 to perform capturing. The imaging system 600 of the present embodiment including the imaging device 10 according to the first or second embodiment can further improve the ranging accuracy.

Although the example of control for avoiding a collision to another vehicle has been described above, the embodiment is applicable to automatic driving control for following another vehicle, automatic driving control for not going out of a traffic lane, or the like. Furthermore, the imaging system is not limited to a vehicle such as the subject vehicle and can be applied to a mobile apparatus (moving apparatus) such as a ship, an airplane, or an industrial robot, for example. In addition, the imaging system can be widely applied to a device which utilizes object recognition, such as an intelligent transportation system (ITS), without being limited to mobile apparatuses.

Modified Embodiments

Note that all of the embodiments described above are mere embodied examples in implementing the present invention, and the technical scope of the present invention should not be construed in a limiting sense by these embodiments. That is, the present invention can be implemented in various forms without departing from the technical concept or the primary feature thereof. For example, it is to be appreciated that an embodiment in which a part of the configuration of any of the embodiments is added to another embodiment or an embodiment in which a part of the configuration of any of the embodiments is replaced with a part of the configuration of another embodiment is also an embodiment to which the present invention may be applied.

In the timing diagram of the embodiments described above, while the control method in the case of capturing a moving image has been illustrated as an example, the present invention is also applicable to capturing of a static image. Further, while the electronic shutter scheme of the timing diagrams of the embodiments described above is assumed to be a global electronic shutter scheme, without being limited thereto, the electronic shutter scheme may be a rolling shutter scheme, for example.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-245447, filed Dec. 27, 2018, which is hereby incorporated by reference herein in its entirety.

What is claimed is:

1. An apparatus for processing data acquired by an imaging device having:
   a photoelectric conversion unit configured to generate charges in accordance with an incident light,
   a charge holding portion configured to hold the charges,
   a charge transfer unit configured to transfer the charges from the photoelectric conversion unit to the charge holding portion, and
   an output circuit configured to output a signal based on the charges transferred to the charge holding portion, the apparatus comprising:
   at least one memory that stores a set of instructions; and
   at least one processor that executes the set of instructions, the set of instructions, when executed, causing the apparatus to perform operations comprising:
   acquiring first image data based on first charges generated in the photoelectric conversion unit in a first exposure time period;
   acquiring second image data based on second charges generated in the photoelectric conversion unit in a second exposure time period that is a sum of exposure time periods for the charges transferred from the photoelectric conversion unit to the charge holding portion for multiple times by the charge transfer unit and is longer than the first exposure time period;
   reducing a gradation value of the second image data to generate third image data; and
   composing the first image data and the third image data to generate fourth image data having an expanded dynamic range,
   wherein in generation of the second image data, a number of times that the second charges are transferred from the photoelectric conversion unit to the charge holding portion is determined in accordance with environmental light information related to an environmental light of a capturing environment, and
   wherein in generation of the third image data, a ratio of reduction of the gradation value is determined in accordance with the environmental light information.

2. The apparatus according to claim 1, wherein the operations further comprising performing gradation conversion on the fourth image data.

3. The apparatus according to claim 1, wherein the gradation value of the second image data is reduced to generate the third image data by performing bit shift on the gradation value of the second image data.

4. The apparatus according to claim 1,
   wherein the first image data and the second image data are able to be acquired on a predetermined frame period basis, respectively, and
   wherein the first image data and the second image data are acquired in a same frame period.

5. The apparatus according to claim 1, wherein in generation of the second image data, a length of a period in which the second charges are transferred from the photoelectric conversion unit to the charge holding portion for the multiple times is a natural-integer multiple of a cycle of turning on and off of a light source in the capturing environment.

6. The apparatus according to claim 1 wherein the imaging device further has a plurality of pixels arranged to form a plurality of rows and a plurality of columns,
   wherein the photoelectric conversion unit, the charge holding portion, and the charge transfer unit are included in each of the plurality of pixels, and
   wherein in the plurality of pixels, operations to transfer the first charges from the photoelectric conversion unit to the charge holding portion are performed at the same time.

7. The apparatus according to claim 1, wherein the first exposure time period is the sum of exposure time periods for the first charges transferred from the photoelectric conversion unit to the charge holding portion for the multiple times.

8. An imaging system comprising:
   the apparatus according to claim 1 configured to process a signal output from the imaging device.

9. A mobile apparatus comprising:
   the imaging device according to claim 1;
   a distance information acquirer that acquires distance information on a distance to an object, from a parallax image based on signals from the imaging device; and
   a controller that controls the mobile apparatus based on the distance information.

10. An apparatus for processing data acquired by an imaging device having:
    a photoelectric conversion unit configured to generate charges in accordance with an incident light,
    a charge holding portion configured to hold the charges,
    a charge transfer unit configured to transfer the charges from the photoelectric conversion unit to the charge holding portion, and
    an output circuit configured to output a signal based on the charges transferred to the charge holding portion, the apparatus comprising:
    at least one memory that stores a set of instructions; and
    at least one processor that executes the set of instructions, the set of instructions, when executed, causing the apparatus to perform operations comprising:
    acquiring first image data based on first charges generated in the photoelectric conversion unit in a first exposure time period;
    acquiring second image data based on second charges generated in the photoelectric conversion unit in a second exposure time period that is a sum of exposure time periods for the charges transferred from the photoelectric conversion unit to the charge holding portion for multiple times by the charge transfer unit and is longer than the first exposure time period;
    reducing a gradation value of the second image data to generate third image data; and
    composing the first image data and the third image data to generate fourth image data having an expanded dynamic range,
    wherein in generation of the second image data, a number of times that the second charges are transferred from the photoelectric conversion unit to the charge holding portion is determined in accordance with environmental light information related to an environmental light of a capturing environment, and
    wherein in generation of the second image data, a cycle in which the second charges are transferred from the photoelectric conversion unit to the charge holding portion is less than or equal to half a cycle of turning on and off of a light source in the capturing environment.

11. The apparatus according to claim 10, wherein the operations further comprising performing gradation conversion on the fourth image data.

12. The apparatus according to claim 10, wherein the gradation value of the second image data is reduced to generate the third image data by performing bit shift on the gradation value of the second image data.

13. The apparatus according to claim 10,
wherein the first image data and the second image data are able to be acquired on a predetermined frame period basis, respectively, and
wherein the first image data and the second image data are acquired in a same frame period.

14. The apparatus according to claim 10, wherein in generation of the second image data, a length of a period in which the second charges are transferred from the photoelectric conversion unit to the charge holding portion for the multiple times is a natural-integer multiple of a cycle of turning on and off of a light source in the capturing environment.

15. The apparatus according to claim 10 wherein the imaging device further has a plurality of pixels arranged to form a plurality of rows and a plurality of columns,
wherein the photoelectric conversion unit, the charge holding portion, and the charge transfer unit are included in each of the plurality of pixels, and
wherein in the plurality of pixels, operations to transfer the first charges from the photoelectric conversion unit to the charge holding portion are performed at the same time.

16. The apparatus according to claim 10, wherein the first exposure time period is the sum of exposure time periods for the first charges transferred from the photoelectric conversion unit to the charge holding portion for the multiple times.

17. An imaging system comprising:
the apparatus according to claim 10 configured to process a signal output from the imaging device.

18. An apparatus for processing data acquired by an imaging device having:
a photoelectric conversion unit configured to generate charges in accordance with an incident light,
a charge holding portion configured to hold the charges,
a charge transfer unit configured to transfer the charges from the photoelectric conversion unit to the charge holding portion, and
an output circuit configured to output a signal based on the charges transferred to the charge holding portion, the apparatus comprising:
at least one memory that stores a set of instructions; and
at least one processor that executes the set of instructions, the set of instructions, when executed, causing the apparatus to perform operations comprising:
acquiring first image data based on first charges generated in the photoelectric conversion unit in a first exposure time period;
acquiring second image data based on second charges generated in the photoelectric conversion unit in a second exposure time period that is a sum of exposure time periods for the charges transferred from the photoelectric conversion unit to the charge holding portion for multiple times by the charge transfer unit and is longer than the first exposure time period;
reducing a gradation value of the second image data to generate third image data; and
composing the first image data and the third image data to generate fourth image data having an expanded dynamic range,
wherein in generation of the second image data, a number of times that the charges are transferred from the photoelectric conversion unit to the charge holding portion is determined in accordance with environmental light information related to an environmental light of a capturing environment, and
wherein in generation of the second image data, a length of a period in which the charges are transferred from the photoelectric conversion unit to the charge holding portion for multiple times is longer than a cycle of turning on and off of a light source in the capturing environment.

* * * * *